US011159646B1

(12) United States Patent
Singh

(10) Patent No.: US 11,159,646 B1
(45) Date of Patent: Oct. 26, 2021

(54) IDENTIFYING, PRESENTING, AND LAUNCHING PREFERRED APPLICATIONS ON VIRTUAL DESKTOP INSTANCES

(71) Applicant: Amazon Technologies, Inc., Seattle, WA (US)

(72) Inventor: Saurabh Kumar Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 849 days.

(21) Appl. No.: 14/798,161

(22) Filed: Jul. 13, 2015

(51) Int. Cl.
*H04L 29/06* (2006.01)
*H04L 29/08* (2006.01)

(52) U.S. Cl.
CPC .............. *H04L 67/42* (2013.01); *H04L 67/02* (2013.01)

(58) Field of Classification Search
CPC ......... H04L 67/10; H04L 67/14; H04L 67/22; H04L 67/34; H04L 67/36; H04L 67/306; H04L 43/08; H04L 63/10; H04L 67/42; H04L 67/02; G06F 9/445; G06F 9/4445; G06F 9/4843; G06F 9/4856; G06F 9/4451; G06F 9/44505; G06F 9/45533; G06F 9/45558; G06F 2009/45575; G06F 3/048; G06F 3/0481; G06F 3/0482; G06F 3/04817; G06F 3/04842; G06F 8/61; G06F 8/65; G06F 9/451; G06F 3/04845

(Continued)

(56) References Cited

U.S. PATENT DOCUMENTS

2005/0188313 A1* 8/2005 Matthews ............. G06F 9/4443 715/741
2007/0157125 A1* 7/2007 Peters ................... G06F 3/0482 715/837

(Continued)

OTHER PUBLICATIONS

Holwerda, Thom, "SuperFetch: How it Works & Myths;" May 11, 2009, http://www.osnews.com/story/21471/SuperFetch_How_it_Works_Myths (Year: 2009).*

(Continued)

*Primary Examiner* — Tan Doan
(74) *Attorney, Agent, or Firm* — Robert C. Kowert; Kowert, Hood, Munyon, Rankin & Goetzel, P.C.

(57) ABSTRACT

A service provider system may provision virtualized computing resources to implement a virtual desktop instance. An interactivity agent installed on the virtual desktop instance may collect data representing interactions between a user and various input devices (e.g. a keyboard or mouse) that are associated with the execution of various desktop applications, and may provide the interactivity data to a desktop application preferences service implemented in the service provider system. The desktop application preferences service may, based on the interactivity data, characterize the usage of the desktop applications and their targets (e.g., documents) to determine which applications and targets are likely to be used during subsequent virtual desktop sessions (e.g., those used most or most recently). When a new session is started, the determined collection of preferred applications (and targets thereof) may be presented in a user interface from which they may be collectively launched, or they may be launched automatically.

20 Claims, 17 Drawing Sheets

(58) Field of Classification Search
USPC ......... 709/203, 217–220, 227, 228; 715/740, 715/747, 778, 810, 811; 718/1, 100, 108
See application file for complete search history.

(56) References Cited

U.S. PATENT DOCUMENTS

| | | | |
|---|---|---|---|
| 2009/0158212 A1 | 6/2009 | Dykstra-Erickson et al. | |
| 2010/0205559 A1 | 8/2010 | Rose | |
| 2011/0010433 A1* | 1/2011 | Wilburn | G06Q 30/02 709/219 |
| 2011/0087982 A1 | 4/2011 | McCann et al. | |
| 2011/0153781 A1* | 6/2011 | Srinivas | G06F 9/4451 709/219 |
| 2012/0066607 A1* | 3/2012 | Song | G06F 9/5077 715/737 |
| 2012/0066679 A1* | 3/2012 | Pappas | G06F 9/45558 718/1 |
| 2012/0089972 A1* | 4/2012 | Scheidel | G06F 9/45558 717/168 |
| 2012/0173731 A1* | 7/2012 | Lin | G06F 9/5072 709/226 |
| 2012/0290583 A1* | 11/2012 | Mahaniok | G06F 8/60 707/741 |
| 2012/0311498 A1 | 12/2012 | Kluttz et al. | |
| 2013/0173637 A1* | 7/2013 | Kim | G06F 17/30283 707/748 |
| 2013/0205294 A1 | 8/2013 | Mittal et al. | |
| 2014/0201526 A1* | 7/2014 | Burgess | G06F 21/316 713/165 |
| 2014/0236930 A1 | 8/2014 | Matthews et al. | |
| 2014/0282606 A1* | 9/2014 | Clark | G06F 9/461 718/108 |
| 2014/0372356 A1 | 12/2014 | Bilal et al. | |
| 2014/0372788 A1* | 12/2014 | Vavrick | G06F 11/0793 714/4.1 |
| 2015/0146716 A1* | 5/2015 | Olivier | H04L 65/1016 370/352 |
| 2015/0154046 A1* | 6/2015 | Farkas | G06F 9/485 718/1 |
| 2015/0248282 A1* | 9/2015 | Zamir | G06F 8/65 717/171 |
| 2015/0373096 A1* | 12/2015 | Chandrasekaran | H04W 4/023 709/226 |
| 2016/0092043 A1* | 3/2016 | Missig | G06F 3/0482 715/811 |
| 2016/0139948 A1* | 5/2016 | Beveridge | G06F 9/45558 718/1 |

OTHER PUBLICATIONS

U.S. Appl. No. 14/536,583, filed Nov. 7, 2014, Sheshadri Supreeth Koushik et al.

* cited by examiner

| application name | vendor | target doc/file/object |
|---|---|---|
| word processing app A | vendor ABC | MyDoc112 |
| word processing app A | vendor ABC | MyDoc87 |
| drawing app E | vendor PQR | MyFIGs34 |
| drawing app E | vendor PQR | MyFIGs33 |
| database app F | vendor ABC | MyBucket |
| task tracking tool | my company | MyTimeJune |
| task tracking tool | my company | MyTimeJuly | launch my apps

*FIG. 5A*

| application name | vendor | target doc/file/object | opt out |
|---|---|---|---|
| word processing app A | vendor ABC | MyDoc87 | ☐ |
| drawing app E | vendor PQR | MyFIGs34 | ☐ |
| drawing app E | vendor PQR | MyFIGs33 | ✓ |
| database app F | vendor ABC | MyBucket | ☐ |
| task tracking tool | my company | MyTimeJuly | ☐ | launch my apps

| application name | vendor | target doc/file/object | select |
|---|---|---|---|
| word processing app A | vendor ABC | MyDoc87 | √ |
| drawing app E | vendor PQR | MyFIGs34 | √ |
| drawing app E | vendor PQR | MyFIGs33 | √ |
| database app F | vendor ABC | MyBucket | |
| task tracking tool | my company | MyTimeJuly | √ | launch selected apps

*FIG. 5C*

| recently used apps + targets | most used apps + targets | recommendations |
|---|---|---|
| word processing app A:<br>    MyDoc112<br>    MyDoc87<br><br>drawing app E:<br>    MyFIGs34<br>    MyFIGs33<br><br>database app F v2.3:<br>    MyBucket<br><br>task tracking tool:<br>    MyTimeJune<br>    MyTimeJuly | word processing app A:<br>    MyDoc87<br><br>drawing app E:<br>    MyFIGs34<br>    MyFIGs33<br><br>database app F v2.3:<br>    MyBucket<br><br>task tracking tool:<br>    MyTimeJuly | word processing app B<br>from vendor PQR  ☐<br><br>drawing app C<br>from vendor ABC  ☑<br><br>database app F 3.0<br>from vendor XYZ  ☐ |
| launch recent apps | launch most used apps | install selected apps |

IDENTIFYING, PRESENTING, AND LAUNCHING PREFERRED APPLICATIONS ON VIRTUAL DESKTOP INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Many large companies are attempting to move data center resources to cloud computing environments. These companies may use large amounts of desktop computing software that must be procured, kept up-to-date, and distributed across many desktop computers in multiple locations, either by repeatedly installing and uninstalling desktop applications on many different physical machines or by providing access to virtualized applications that execute in virtual computing environments (e.g., on virtual desktop instances). In some cases, different end users may use different collections of desktop applications to perform their day-to-day work. The end users may create shortcuts to be displayed on their virtual desktop instances to facilitate the launching of their favorite desktop applications, or may add them (individually) to a start menu.

BRIEF DESCRIPTION OF THE DRAWINGS

FIGS. 5A-5C illustrate examples of graphical user interfaces (GUIs) that may be presented to an end user on a virtual desktop instance, according to different embodiments.

FIG. 7 illustrates an example user interface that includes multiple sections to present two different lists of preferred desktop applications for a particular virtual desktop instance (along with preferred targets of those applications) and a list of recommended applications for the virtual desktop instance, according to different embodiments.

Figure 1:
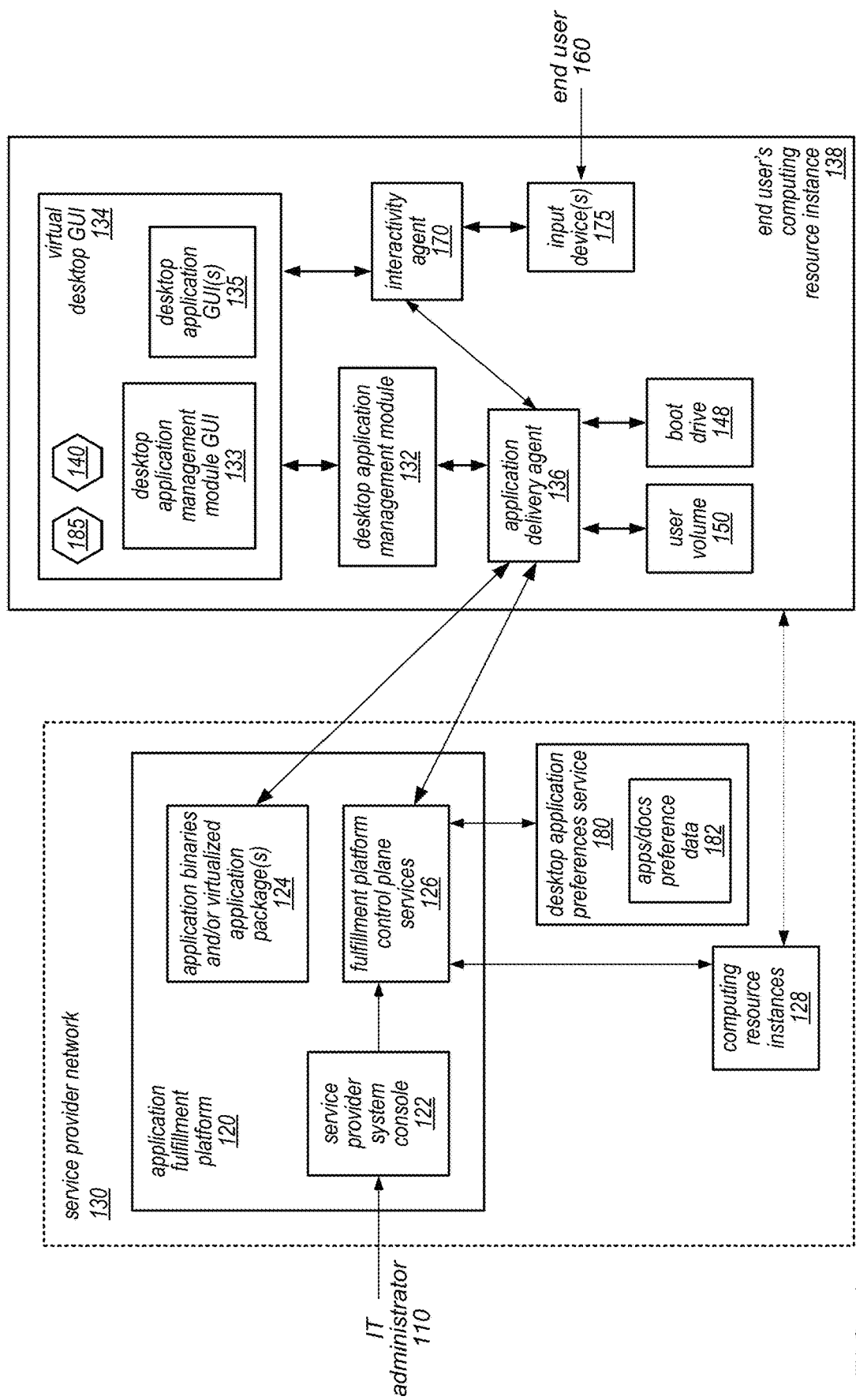
FIG. 1 is a block diagram illustrating one embodiment of a service provider system that is configured to provide on-demand delivery of applications (e.g., desktop applications) to computing resource instances of its customers' end users and to identify, present, and launch preferred desktop applications on virtual desktop instances based on collected interactivity information.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of systems and methods for identifying, presenting, and launching preferred desktop applications on virtual desktop instances are described herein. The service provider systems described herein may provide virtualized computing resources to clients, and may also provide on-demand delivery and installation of desktop applications to virtual desktop instances in a cloud computing environment for the benefit of end users (e.g., employees or members of a business, enterprise, or other organization that is a customer of the service provider).

In some embodiments, the service provider system may provision virtualized computing resources to implement a virtual desktop instance. As described in more detail herein, an interactivity agent may be installed on the virtual desktop instance and may collect data representing interactions between a user and various input devices that are associated with the execution of various desktop applications. The interactivity agent may provide this interactivity data to a desktop application preferences service implemented in the service provider system. The desktop application preferences service may, dependent on the interactivity data, characterize the usage of the desktop applications that are installed on the virtual desktop instance and/or the targets of those desktop applications (e.g., documents, files, or other objects) to determine which applications and targets thereof are likely to be used during subsequent virtual desktop sessions. For example, in some embodiments, the desktop application preferences service may be configured to identify a collection of the desktop applications and/or targeted documents, files, or objects that are the preferred desktop applications and/or targets for the virtual desktop instance based on which of the applications (or targets) are executed (or accessed) the most during a particular time period or are the most recently executed (or accessed).

In some embodiments, the desktop application preferences service may provide information about the collection of preferred applications and targets thereof to a display generation component, which may generate a display on the virtual desktop instance to present the collection of preferred applications and targets to an end user (e.g., when a new virtual desktop session is invoked). As described in more detail herein, the end user may be able to launch all of the preferred applications and targets collectively (e.g., by selecting a single user interface element) and/or may be able to include or exclude particular applications and/or target documents, files, or objects (e.g., specific pairings of applications and their targets) by selecting user interface elements for opting into or out of a collective launch of the preferred applications and targets. In some embodiments, all of the desktop applications and targets thereof that have been identified as preferred applications or targets may be launched automatically in response to the invocation of a new virtual desktop session (e.g., without further intervention by the end user on whose behalf the new virtual desktop session is invoked).

One embodiment of a service provider system that is configured to provide on-demand delivery of applications (e.g., desktop applications) to computing resource instances of its customers' end users and to identify, present, and launch preferred desktop applications on virtual desktop instances based on collected interactivity information is illustrated by the block diagram in FIG. 1. As illustrated in this example, the system, implemented on service provider network 130, may include an application fulfillment platform (shown as application fulfillment platform 120). The application fulfillment platform may include an interface mechanism (shown as service provider system console 122) through which an IT administrator of a service provider customer (e.g., a business, enterprise, or organization that receives computing services, storage services, and/or access to second or third party applications from the service provider) can manage the fulfillment of various applications to their end users (e.g., employees or members of the same business, enterprise, or organization). For example, the IT administrator (shown as IT administrator 110) may log into application fulfillment platform 120 (e.g., through a browser or a dedicated client-side application) to access service provider system console 122. The IT administrator 110 may then provide input (e.g., requests for service entered in a graphical user interface of service provider system console 122) in order to create a catalog of applications to be provisioned for the use of their end users, to assign applications to particular end users or user groups, or to generate, obtain, or view usage reports for the applications in the catalog by their end users.

As illustrated in this example, application fulfillment platform 120 may include multiple fulfillment platform control plane services 126, various ones of which may be invoked in response to the inputs received from the IT administrator 110. For example, in response to inputs specifying the addition of an application to a catalog and the assigning of the application to one or more users, a "create fulfillment" workflow may be initiated, which may include operations performed by a fulfillment service, an entitlement service, a delivery service, a packaging service, a device identifier service, and/or a proxy service. As illustrated at 124, in this example, applications may be delivered to an end user (such as end user 160) as application binaries (e.g., desktop applications that have been prepared for physical installation on an end user's computing resource instance) and/or as virtualized application packages. For example, in some embodiments, the service provider may (e.g., when ingesting desktop applications for the benefit of its customers and their end users) transform desktop applications into virtualized application packages to be delivered to end users' computing resource instances, and those virtualized application packages may be executed on those computing resource instances without the end user having to install the desktop applications themselves on those computing resource instances.

In some embodiments, an application delivery agent (such as application delivery agent 136) and a desktop application management module (such as desktop application management module 132) may be installed on the end user's computing resources instance 138. In various embodiments, computing resource instance 138 may be a physical computing device (e.g., a desktop or laptop computer, a tablet computing device, or a smart phone) or may be a virtualized computing resource instance (e.g., one that implements a virtual desktop instance). Application delivery agent 136 (which may be a client component of application fulfillment platform 120) may be configured to communicate with various fulfillment platform control place services 126 in order to fulfill requests to subscribe to, install, and/or execute applications selected through desktop application management module GUI 133 or through another user interface mechanism (e.g., application icon 140 or preferred application launch icon 185 on virtual desktop GUI 134, a separate desktop application preferences service GUI, or a start menu item). In other words, desktop application management module 132 is an application that may be installed on the end user's computing resource instance 138 to allow the end user 160 to interact with application fulfillment platform 120 through application delivery agent 136.

As illustrated in FIG. 1, the service provider network may include physical and/or virtualized computing resource instances (e.g., computation resource instances and/or storage resource instances) that may be provisioned on behalf of the business, enterprise, or organization (and its end users). In some embodiments, these computing resources instances (shown as computing resource instances 128 on service provider network 130) may be configured to implement a remote computing application that allows an end user 160 to access applications executing on computing resource instances 128 as if they were installed and executing locally on their machine. For example, in some embodiments, one or more of these computing resources instances 128 may be configured to implement a virtual desktop instance (which may serve as the end user's computing resource instance 138) on which an application delivery agent 136, a desktop application management module 132, and an interactivity agent 170 are installed. In such embodiments, virtual desktop GUI 134 in FIG. 1 may represent a view presented by the virtual desktop instance and may appear to the end user 160 as if it were a desktop on the end user's local (physical) computing device. In such embodiments, various GUIs associated with applications executing on the virtual desktop instance (shown as desktop application GUIs 135) may be presented within virtual desktop GUI 144.

In some embodiments, service provider network 130 may also include storage resources outside of application fulfillment platform 120 (which may be managed by a storage service implemented within service provider network) that are configured to store data utilized by application fulfillment platform 120. In various embodiments, application binaries, virtualized application packages, various tables that store information about applications and collections thereof, application state data (which may include application templates, application configuration information, and/or other types of application settings), collected interactivity information that is associated with the execution of various applications, usage information for various applications and/or targets thereof, lists of preferred applications and/or targets thereof, lists of recommended applications, various configuration parameter values and/or other information used to implement the techniques described herein may be stored outside of application fulfillment platform 120 instead of, or in addition to, within application fulfillment platform 120. In various embodiments, such a storage service may be an object storage service, a file storage service, a database service or any other type of storage service to which application state and/or scratch data can be stored and from which this data can be subsequently retrieved.

As illustrated in this example, desktop application management module 132 (through which the end user 160 may select applications for installation or execution) may execute on the end user's computing resource instance 138, and a graphical user interface of desktop application management module 132 (shown as desktop application management module GUI 133) may be displayed on virtual desktop GUI 134. For example, this interface may present a list of applications for selection by the end user 160 (e.g., in order to subscribe to, install, and/or execute an application). In addition, a shortcut or icon for an application (shown as element 140 in FIG. 1) may be displayed on virtual desktop GUI 134 and may be selected in order to launch the corresponding application (e.g., desktop application management module 132, or one of the applications delivered for execution on computing resource instance 138 in response to its selection, by the end user 160, within desktop application management module 132).

In some embodiments, preferred application launch icon 185 may be presented on virtual desktop GUI 134 and may be selected in order to launch some or all of a collection of applications (and targets thereof) that are determined to be preferred applications and/or targets by desktop application preferences service 180. For example, interactivity agent 170 may intercept and/or collect data representing the interactions of end user 160 with one or more input devices 175 and may communicate that information to the application fulfillment platform 120 (e.g., through application delivery agent 136), which may provide the interactivity information to desktop application preferences service 180. Desktop application preferences service 180 may be configured to characterize various applications and/or their targets based, at least in part, on the interactivity information received from interactivity agent 170, and to store information indicating the results of the characterization as apps/docs preference data 182. In some embodiments, desktop application preferences service 180 may include a display generation component that is configured to generate content for display on virtual desktop GUI 134 (e.g., content such as that illustrated in any of FIGS. 5A-5C, 7, and/or 8A-8C). In other embodiments, such a display component may be included in fulfillment platform control plane services 126. In such embodiments, apps/docs preference data 182 may be provided to control plane service 126 for subsequent display on virtual desktop GUI 134.

As illustrated in this example, two separate storage volumes (shown as user volume 150 and boot drive 148) may be installed on the end user's computing resource instance 138. For example, in some embodiments, applications that are delivered to the end user's computing resource instance 138 by the application fulfillment platform may be installed on boot drive 148, and any application state data and/or scratch data that is generated during the building or use of these applications may be written to user volume 150 for subsequent attachment to those applications (e.g., following the re-provisioning of a virtual desktop instance). Note that in embodiments in which the end user's computing resource instance 138 is a virtualized computing resource instance, boot drive 148 and/or user volume 150 may be implemented by computing resources instances 128 on the service provider network 130.

In many cases, when an end user uses a client application to connect with a virtual desktop instance in the cloud, the client interacts with the virtual desktop using mouse clicks and a keyboard, for example. The end user may launch a browser or one or more other applications (e.g., desktop applications and/or internet applications), may open various documents or files (e.g., documents or file that the end user accesses many times over multiple virtual desktop sessions), modify them, and then close them. The end user may then disconnect from (or get disconnected from) the virtual desktop instance (e.g., due to logging off or due to the virtual desktop instance being rebooted). Later, however, the end user may wish to pick up their work where they left off, e.g., launching the same applications and/or opening the same documents or files during multiple subsequent virtual desktop sessions. In various embodiments, the techniques described herein may allow the end user to quickly launch their preferred applications and/or open their preferred documents or files without having to navigate to multiple directories and folders or having to rely on start menus, shortcuts, or other existing mechanisms for individually selecting the applications (and targets thereof) that the end user wishes to execute (or access).

As noted above, in some embodiments, an interactivity agent (such as interactivity agent 170 illustrated in FIG. 1) executing on the virtual desktop instance may be configured to intercept the end user's interactions with the virtual desktop instance. The interactivity agent may interpret all of end user's inputs (e.g., mouse clicks and keyboard input) and may translate them into corresponding operating system calls, which (when invoked) cause the results of the mouse clicks and keyboard inputs/actions to be observed. In some embodiments, the interactivity agent may also provide the interactivity information to a separate parallel agent (e.g., a desktop application preferences service such as desktop application preferences service 180 illustrated in FIG. 1) that is running on the service provider system and that is responsible for monitoring which applications are being executed on the virtual desktop instance and/or which documents, files, or other objects are being accessed from within the executing applications (e.g., opened for viewing and/or modified).

As described in more detail herein, the desktop application preferences service may generate (or initiate the generation of) a pop-up notification (e.g., a balloon) or another type of display that may be displayed automatically in a virtual desktop instance GUI when a virtual desktop session is started or restarted and that may present (e.g., in a pop-up view) all of the applications and documents/files that the end user has been working on (or that they might want to work on). The display may include a user interface element (such as preferred application launch icon 185) with which (e.g., with one click) the end user may be able to launch all of these preferred applications and/or open all of these preferred documents/files. Unlike with some existing mechanisms, an end user may not need to explicitly designate or mark their frequently used applications or documents/files as being "favorites" or "preferred" and may not need to pin them to start menus or shortcuts in order to quickly launch them in the virtual desktop environment. Instead, as the end users launches various applications and/or accesses other documents/files, the desktop application preferences service may be configured to update information indicating the current collection of preferred applications and/or targets thereof, based on additional interactivity data that is received from the interactivity agent and that is associated with those actions, and make it available to a display generation component for subsequent presentation to the end user or may automatically launch the applications and targets thereof that are included in the current collection of preferred applications and targets in response to certain events (e.g., when a new virtual desktop session is invoked).

In addition, unlike with some exiting mechanisms, the techniques described herein may be used to launch multiple applications of different types and/or to open multiple target documents/files collectively (e.g., from within a single user interface and/or through selection of a single user interface mechanism). In some embodiments, the desktop application preferences service may be configured to generate a display that presents a list of most used or most recently used applications and target document/files (of a variety of application and/or document/file types) and that allows the end user to selectively include or exclude particular applications or documents/files in an operation to launch a collection of preferred applications and their respective targets.

Figure 2:
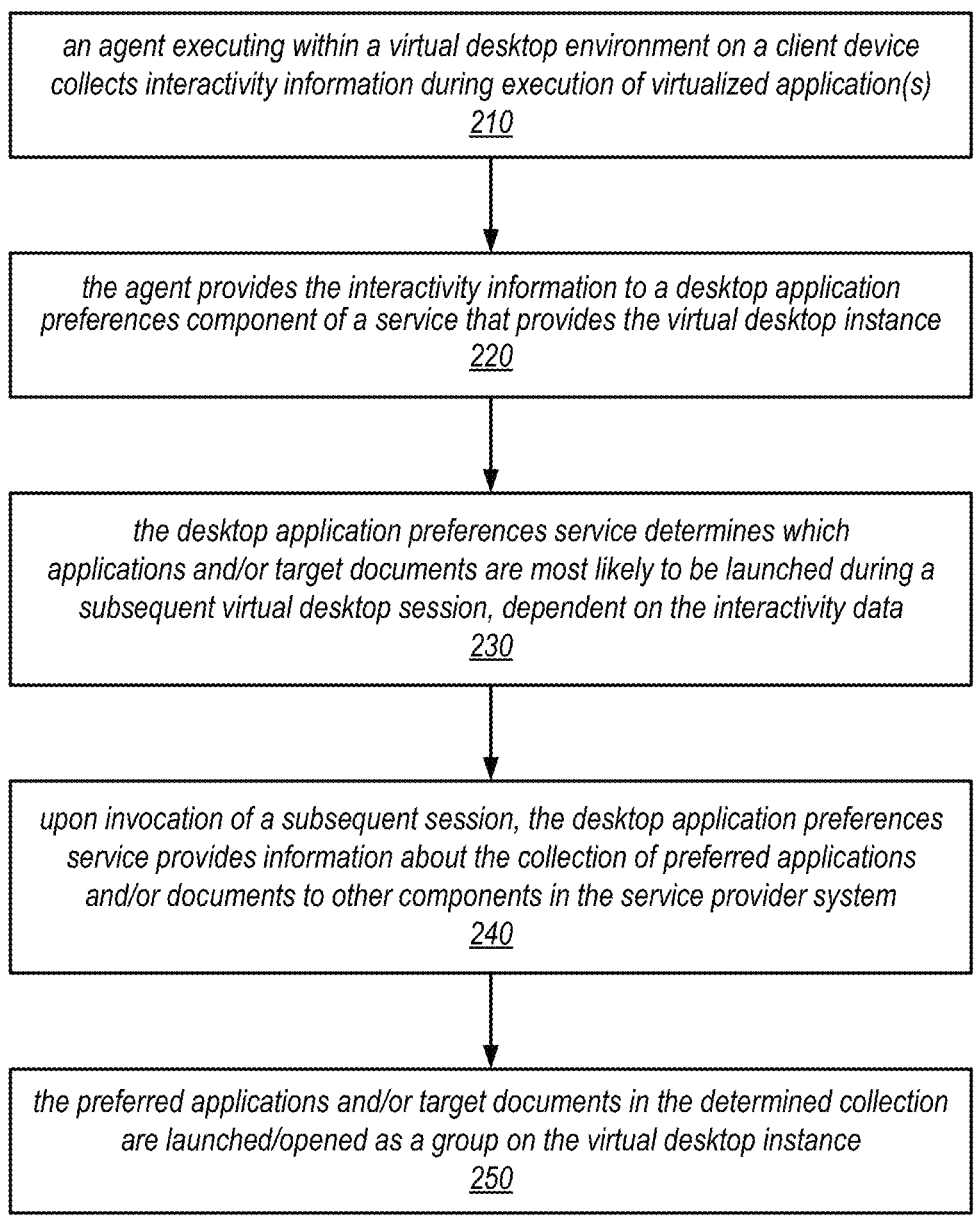
FIG. 2 is a flow diagram illustrating one embodiment of a method for launching preferred applications and opening preferred targets of those applications in a virtual desktop environment.

One embodiment of a method for launching preferred applications and opening preferred targets of those applications in a virtual desktop environment is illustrated by the flow diagram in FIG. 2. As illustrated at 210, in this example, the method may include an agent that is executing within a virtual desktop environment on a client device collecting interactivity information during (and/or associated with) the execution of one or more virtualized applications in the virtual desktop environment (e.g., on a virtual desktop instance). The method may also include the agent providing the interactivity information to a desktop application preferences component of the service that provides the virtual desktop instance (e.g., a desktop application preferences service implemented on a service provider network that provides virtual computing services to one or more clients), as in 220.

As illustrated in this example, the method may include the desktop application preferences service determining which applications and/or target documents are most likely to be launched during a subsequent virtual desktop session, dependent (at least in part) on the interactivity data, as in 230. At some point later, upon invocation of a subsequent session, the method may include the desktop application preferences service providing information about this collection of preferred applications and/or target documents (e.g., a collection of preferred applications and/or target documents for launching/opening on the virtual desktop instance in response to the invocation of a subsequent virtual desktop session, the rebooting or restarting of the virtual desktop instance, or a reconnection by an end user to the virtual desktop instance on the client device) to one or more other components of service provider system as in 240. As described in more detail below, these other components may include a display generation component or another component of an application fulfillment platform, in different embodiments. The method may also include launching and/or opening the preferred applications and/or target documents in the determined collection as a group on the virtual desktop instance, as in 250. Various methods for initiating the launching and/or opening the preferred applications and/or target documents are described in more detail herein, according to at least some embodiments.

As noted above, an interactivity agent may be configured to collect data representing interactions between an end user and various desktop applications executing on a virtual desktop instance. For example, the interactivity data may include one or more of: data representing input from a keyboard, data representing input from a mouse, data representing input from a trackball, or data representing input from a touch pad, or a time stamp indicating when the data was captured. In some embodiments, all of the interactivity data may be sent to a service on the service provider network (e.g., a desktop application preferences service), along with an identifier of the virtual desktop instance and other information that may be usable in determining which applications and targets thereof are most likely to be launched/opened during subsequent virtual desktop sessions. This additional information (which may be stored in association with the corresponding interactivity data in a secure location on storage resources in the service provider system) may include data representing any or all of: a unique identifier of the virtual desktop instance, a unique identifier of the end user, the time at which an application was launched or closed, the length of time that an application was used, the time at which a document or file was opened or closed with an application, the length of time that a document or file was open, the application type, the document or file type, a version number associated with the application, a version number associated with the target document or file, the location of an application, the location of a target document or file, or a time-to-live indicator. In some embodiments, the format in which the information is stored may be dependent on the values of one or more system-wide, customer-specific, enterprise-wide, instance-specific, or user-specified configuration parameters, while in others, it may be fixed within a given system.

In some embodiments, the interactivity data and other data associated with the execution of desktop applications on a virtual desktop instance may be aggregated and analyzed cumulatively, e.g., within particular virtual desktop sessions, after a fixed period of time (e.g., once per week or once per month), or over the lifetime of the virtual desktop instance. In other embodiments, the interactivity data and other data associated with the execution of desktop applications on a virtual desktop instance may be aggregated and analyzed on the basis of a sliding time window (e.g., one having a pre-determined duration). For example, in some embodiments, at least some of the elements of the interactivity data and other data associated with the execution of desktop applications may be associated with time-to-live indicators. In such embodiments, these elements may be discarded when their time-to-live indicators expire. Thus, the identification of collections of preferred applications and/or targets may rely more heavily on the most recently received data (e.g., data whose time-to-live indicators have note expired).

Figure 3:
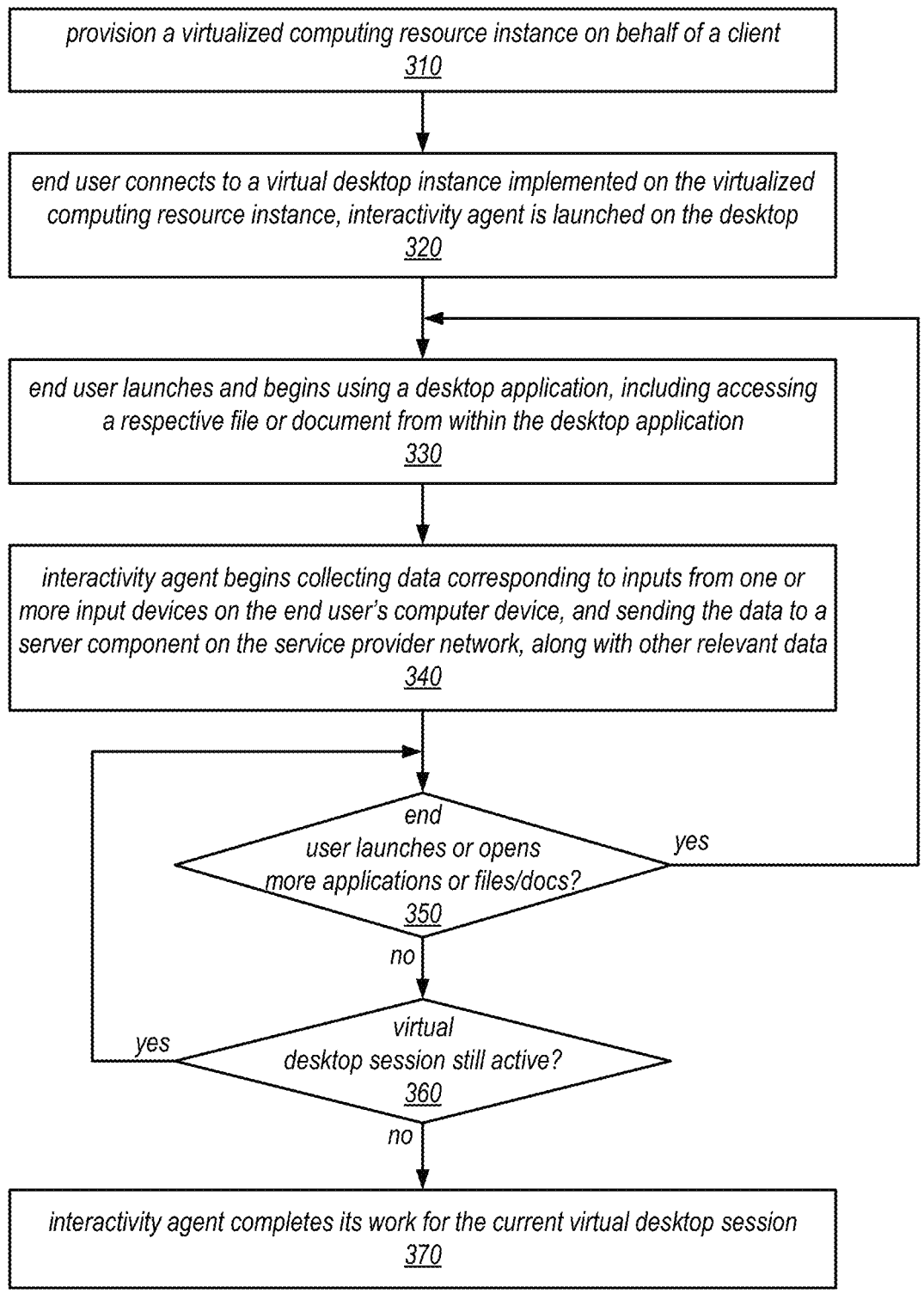
FIG. 3 is a flow diagram illustrating one embodiment of a method for collecting interactivity data in a virtual desktop environment.

One embodiment of a method for collecting interactivity data in a virtual desktop environment is illustrated by the flow diagram in FIG. 3. As illustrated at 310, in this example, the method may include provisioning a virtualized computing resource instance on behalf of a client (e.g., a customer or service subscriber). The method may include an end user (e.g., a service provider customer or an end user in a service provider customer organization) connecting to a virtual desktop instance that is implemented on the virtualized computing resource instance, and an interactivity agent being launched on the virtual desktop instance (as in 320). For example, in some embodiments, the interactivity agent may be launched automatically when the virtual desktop instance is provisioned or when the end user logs into the virtual desktop instance. The method may include the end user launching a desktop application to which the end used is entitled on the virtual desktop instance (e.g., one that is already installed on the virtual desktop instance or that is installed in response to a request by the end user to do so) and beginning to use the desktop application, as in 330. As illustrated in this example, this may include accessing a respective file or document from within the desktop application.

As illustrated in this example, the method may include the interactivity agent beginning to collect data corresponding to inputs from one or more input devices on the end user's computer device, and sending the interactivity data (along with other relevant data, as described above) to a server component on the service provider network, as in 340. For example, the interactivity data and other relevant data may be written to a secure, pre-determined storage location on service provider resources and stored there in association with a unique identifier of the virtual desktop instance. In this example, while the virtual desktop session remains active, the method may include waiting for the end user to launch more applications and/or open additional target files or documents. This is illustrated in FIG. 3 by elements 350 and 360 and by the paths from the negative exit of 350 to 360 and from the positive exit of 360 to the input of 350.

If and when the end user launches an additional application or opens additional target files or documents (shown as the positive exit from 350), the method may include repeating the operations shown in 330 and 340 for each addition application and/or target document/file (e.g., for each additional application/target combination). Once the virtual desktop session is no longer active (e.g., due to a crash, the end user logging out or another type of discontinuation or disconnection), shown as the negative exit from 360, the interactivity agent may complete its work for the current virtual desktop session, as in 370.

Note that, in at least some embodiments, the amount of data received from the interactivity agent, the type of data received from the interactivity agent, and/or the preferences policy applied when determining a collection of preferred desktop applications may be dependent on the values of one or more system-wide, customer-specific, enterprise-wide, instance-specific, or user-specified configuration parameters.

As noted above, in some embodiments, a desktop application preferences service may be configured to determine which applications that are installed on a virtual desktop instance are preferred applications and/or which documents, files, or other objects accessed by the applications installed on the virtual desktop instance are the preferred targets of those applications, and the determination may be based on any of a variety of preference policies. For example, the determination may be based on how recently each the desktop applications installed on the virtual desktop instance was executed on the virtual desktop instance, on the cumulative amount of time that each of the desktop applications was executed on the virtual desktop instance during one or more virtual desktop sessions, or on other criteria.

Figure 4:
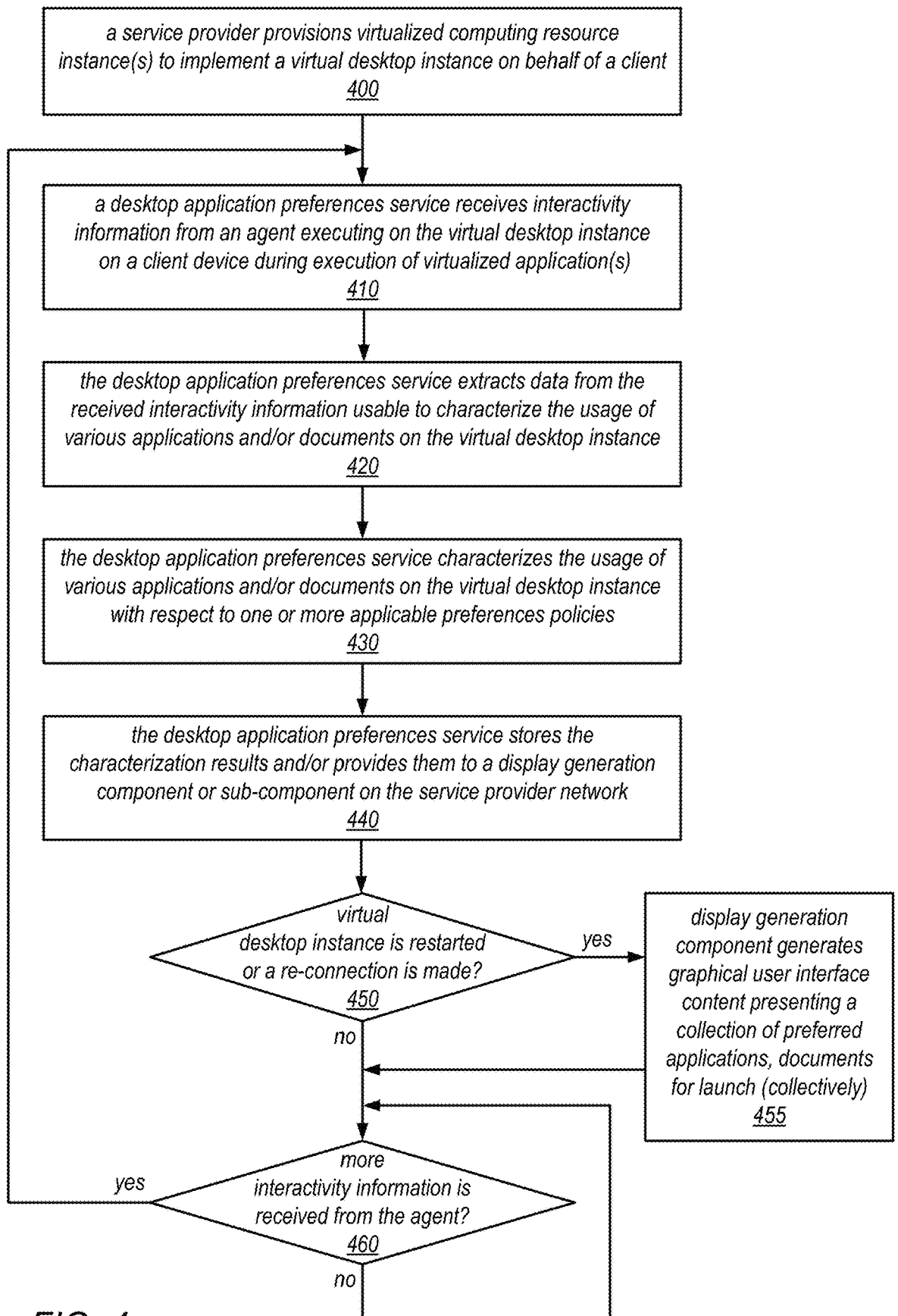
FIG. 4 is a flow diagram illustrating one embodiment of a method for determining application preferences and/or generating a display that includes the preferred applications and/or application targets for a particular virtual desktop instance.

One embodiment of a method for determining application preferences and/or generating a display that includes the preferred applications and/or application targets for a particular virtual desktop instance is illustrated by the flow diagram in FIG. 4. As illustrated at 400, in this example, the method may include a service provider provisioning one or virtualized computing resource instances to implement a virtual desktop instance on behalf of a client. The method may include a desktop application preferences service (e.g., one executing on a service provider network that provides virtualized computing services) receiving interactivity information from an agent executing on the virtual desktop instance on a client device during execution of one or more virtualized applications, as in 410. For example, in some embodiments, a desktop application preferences service may receive interactivity data from an interactivity agent executing on a virtual desktop instance and may save it (e.g., in association with a unique identifier of the virtual desktop instance) for subsequent analysis.

As illustrated in this example, the method may include the desktop application preferences service extracting data from the received interactivity information that is usable to characterize the usage of various applications and/or the documents/files that are the targets of those applications on the virtual desktop instance (as in 420). The method may also include the desktop application preferences service characterizing the usage of various applications and/or the documents/files that are the targets of those applications on the virtual desktop instance with respect to one or more applicable preferences policies (some of which may be dependent on the values of one or more configurable parameters whose values are set by an IT administrator of a customer organization on whose behalf the virtual desktop instance was provisioned), as in 430. In some embodiments, the desktop application preferences service may perform a characterization periodically (e.g., generating application preferences information on a pre-determined schedule or at pre-determined time intervals) or may perform an iteration of the characterization (and generating a respective preference decision) each time it receives additional data. In various embodiments, the characterizations may take into account cumulative interactivity information for the virtual desktop instance over the long term (e.g., over the lifetime of the virtual desktop instance) and/or interactivity information collected during a sliding window of time having a fixed duration (e.g., in which case it may perform a characterization each the time window expires).

The method may include the desktop application preferences service storing the characterization results (e.g., in a secure storage location on service provider resources) and/or providing them directly to a display generation component (or a display generation sub-component of the desktop application preferences service) on the service provider network, as in 440. If and when, at some point in the future, the virtual desktop instance is restarted or a re-connection to the virtual desktop is made (e.g., following a crash of the client's computing device, the end user logging out or another type of discontinuation or disconnection), the method may include the display generation component generating a graphical user interface (or content therefor) that presents a collection of preferred applications and corresponding documents/files targeted by the preferred applications for launching (collectively) on the virtual desktop instance, where the content presented is dependent on the characterization results. This is illustrated in FIG. 4 by the positive exit of 450 and element 455.

As illustrated in this example, until the virtual desktop instance is restarted or a re-connection to the virtual desktop is made, or after the display generation component generates graphical user interface (or content therefor) that presents a collection of preferred applications and corresponding documents/files, the method may include waiting for more interactivity information to be received (e.g., from the interactivity agent on the given virtual desktop instance) before taking additional actions. This is illustrated in FIG. 4 by the path from the negative exit of 450 to 460 and by the path from the positive exit of 450 to 455 and then to 460. If and when more interactivity information is received from the interactivity agent on the given virtual desktop instance (shown as the positive exit from 460), the method may include repeating the operations shown in 410-455, as appropriate (e.g., in order to update the characterization of the usage of various applications and/or the documents/files that are the targets of those applications on the virtual desktop instance with respect to the applicable preferences policies).

Note that the user interfaces presented in a system that implements the techniques described herein for identifying, presenting, and launching collections of preferred applications and targets thereof may be implemented in different ways in different embodiments. For example, the description of the collection of preferred desktop applications may be presented in the display as a list, a pop-up window, or a notification, in different embodiments, and the user interface elements whose selection initiates the launching of at least some of the desktop applications and targets thereof in the collection of preferred applications and targets may include a radio button, a check box, an icon, or a menu item, in different embodiments. As illustrated in FIG. 1, in some embodiments, a special icon (such as preferred application launch icon 185) may be presented on a GUI of the virtual desktop instance and may be selected at any time in order to launch some or all of a collection of applications (and targets thereof) that are determined to be preferred applications and/or targets by the desktop application preferences service, even when that collection includes applications and targets of multiple different types.

FIGS. 5A-5C illustrate examples of graphical user interfaces (GUIs) that may be presented to an end user on a virtual desktop instance, according to different embodiments. In some embodiments, the graphical user interfaces illustrated in these figures may represent pop-up windows or "balloons" that are displayed automatically when the end user connects to the virtual desktop instance or in response to selection of an icon, radio button, check box, menu item, or other user interface mechanism associated with the GUIs, or may represent GUIs of another type that are displayed in response to selection of an icon, radio button, check box, menu item, or other user interface mechanism associated with the GUIs. In these examples, different preferences policies may be applied (e.g., by a desktop application preferences service) in order to determine which and/or how many applications and/or targets to present to the end user. Note that in other embodiments, different policies may be applied in order to determine a collection of preferred applications and/or targets thereof and the results of this determination may be presented in different formats that include more, fewer, or different elements than those depicted in FIGS. 5A-5C and arranged using any of a variety of layouts. Note also that the preferred applications shown in these figures may be listed in any order, in different embodiments, e.g., in alphabetical order by name or vendor, by application type (e.g., productivity applications, data analysis applications, line-of-business applications, etc.), by cumulative usage, by date/time of most recent usage, or using any other ordering criteria. For example, in some embodiments, the format and/or content of what is presented may be customizable dependent on the values of one or more system-wide, customer-specific, enterprise-wide, instance-specific, or user-specified configuration parameters, while in other embodiments, the format and/or content may follow a fixed or default template that is implemented in the system.

In one example, FIG. 5A illustrates a display 500 (e.g., a pop-up window, balloon, or other GUI) that presents a list of preferred desktop applications (along with preferred targets of those applications) and a single "launch my apps" interface mechanism (e.g., a radio button, check box, icon, or other selectable user interface mechanism). In this example, the list includes, for each preferred application and corresponding target combination, the name of the preferred application, the vendor for the preferred application, and the preferred target document, file, or object of the preferred application. Here, selection of the user interface mechanism "launch my apps" may cause all of the listed applications to be launched, and the corresponding target documents, files, or objects to be opened within the applications, once launched. In other words, when presented with a list of the preferred applications and their targets (e.g., as determined by a desktop preferences service based on interactivity information collected on the virtual desktop instance), the end user may choose to launch and/or open all of the items on the list using a single selection. In this example, it may be the case that the list of preferred applications and corresponding targets was determined according to a policy that identifies as preferred applications/targets those applications/targets that were used most recently (e.g., the four most recently used applications and the more recently used targets of those applications, up to an optional limit on the number of preferred targets).

Again note that display 500 may, in other embodiments, present more, less, or different information than that depicted in FIG. 5B. For example, display 500 may not include vendor information, or display 500 may include additional information, such as time stamps indicating the last time each application or target was launched or opened, the duration of time that each application was used or that a target was open, version identifiers for each application or target, the locations (e.g., a file paths) for each application or target, or any other information that is not included in the example GUI depicted in FIG. 5A.

In another example, FIG. 5B illustrates a display 510 (e.g., a pop-up window, balloon, or other GUI) that presents a list of preferred desktop applications (along with preferred targets of those applications) and a single "launch my apps" interface mechanism (e.g., a radio button, check box, icon, or other selectable user interface mechanism). In this example, the list includes, for each preferred application and corresponding target combination, the name of the preferred application, the vendor for the preferred application, and the preferred target document, file, or object of the preferred application. However, unlike in display 500 illustrated in FIG. 5A, display 510 also includes, for each of the listed application/target combinations, a check box for opting out of the collective launch of the listed preferences. In other words, when presented with a list of the preferred applications and their targets (e.g., as determined by a desktop preferences service based on interactivity information collected on the virtual desktop instance), the end user may choose not to launch or open selected ones of the items on the list, but all of the items on the list may be launched/opened (by default) absent this additional input.

In this example, selection of the user interface mechanism "launch my apps" may cause only the listed applications for which at least one application/target check box is unchecked to be launched, and only the target documents, files, or objects for which the corresponding check boxes are unchecked to be opened within the applications, once launched. In this example, it may be the case that the list of preferred applications and corresponding targets was determined according to a policy that identifies as preferred applications/targets those applications/targets that were used the most (e.g., the four applications that experienced the most cumulative usage over some period of time and the most accessed targets of those applications, up to an optional limit on the number of preferred targets). Therefore, fewer application/target combinations are included in display 510 than in display 500, even though they may both be based on interactivity data from the same virtual desktop instance.

As in the previous example, display 510 may, in other embodiments, present more, less, or different information than that depicted in FIG. 5B. For example, display 510 may not include vendor information, or display 510 may include additional information, such as time stamps indicating the last time each application or target was launched or opened, the duration of time that each application was used or that a target was open, version identifiers for each application or target, the locations (e.g., a file paths) for each application or target, or any other information that is not included in the example GUI depicted in FIG. 5B.

In yet another example, FIG. 5C illustrates a display 520 (e.g., a pop-up window, balloon, or other GUI) that presents a list of preferred desktop applications (along with preferred targets of those applications) and a single "launch selected apps" interface mechanism (e.g., a radio button, check box, icon, or other selectable user interface mechanism). In this example, the list includes, for each preferred application and corresponding target combination, the name of the preferred application, the vendor for the preferred application, and the preferred target document, file, or object of the preferred application. However, display 520 also includes, for each of the listed application/target combinations, a check box for selecting individual ones of the application/target combinations for including in the collective launch of the listed preferences. In other words, when presented with a list of the preferred applications and their targets (e.g., as determined by a desktop preferences service based on interactivity information collected on the virtual desktop instance), the end user may choose which of the items on the list should be launched, and (by default) none of the items on the list may be launched without this additional input.

In this example, selection of the user interface mechanism "launch selected apps" may cause only the listed applications for which at least one application/target check box is checked to be launched, and only the target documents, files, or objects for which the corresponding check boxes are checked to be opened within the applications, once launched. In this example, it may be the case that the list of preferred applications and corresponding targets was determined according to a policy that identifies as preferred applications/targets those applications/targets that were used the most (e.g., the four applications that experienced the most cumulative usage over some period of time and the most accessed targets of those applications, up to an optional limit on the number of preferred targets). Therefore, fewer application/target combinations are included in display 520 than in display 500 (e.g., the same application/target combinations that are shown in display 510), even though they may both be based on interactivity data from the same virtual desktop instance.

As in the previous examples, display 520 may, in other embodiments, present more, less, or different information than that depicted in FIG. 5C. For example, display 520 may not include vendor information, or display 520 may include additional information, such as time stamps indicating the last time each application or target was launched or opened, the duration of time that each application was used or that a target was open, version identifiers for each application or target, the locations (e.g., a file paths) for each application or target, or any other information that is not included in the example GUI depicted in FIG. 5C.

In some embodiments, the systems described herein may include a recommendation engine that, based on some or all of the interactivity data and other relevant that is used to identify collections of preferred applications and their targets, may recommend other applications for use within a virtual desktop instance. For example, based on how (and/or how much or how often) certain preferred applications are executed, the recommendation engine may recommend applications from other vendors or that are used by other enterprises (or other teams or individual end users within the same enterprise) and that perform functions similar to those performed by one or more of the preferred applications. In another example, the recommendation engine may recommend an additional application that operates on the same types of documents, files, or data sets as one of the preferred applications (e.g., the types of the preferred targets). In some embodiments, the recommendation engine may select applications for recommendations from among a large catalog of applications that are available to end users but that may be too intimidating for the end user to investigate on their own. In some embodiments, the recommendation engine may be a stand-alone component on the service provider network, while in other embodiments, it may be a sub-component of the desktop application preferences service.

Figure 6:
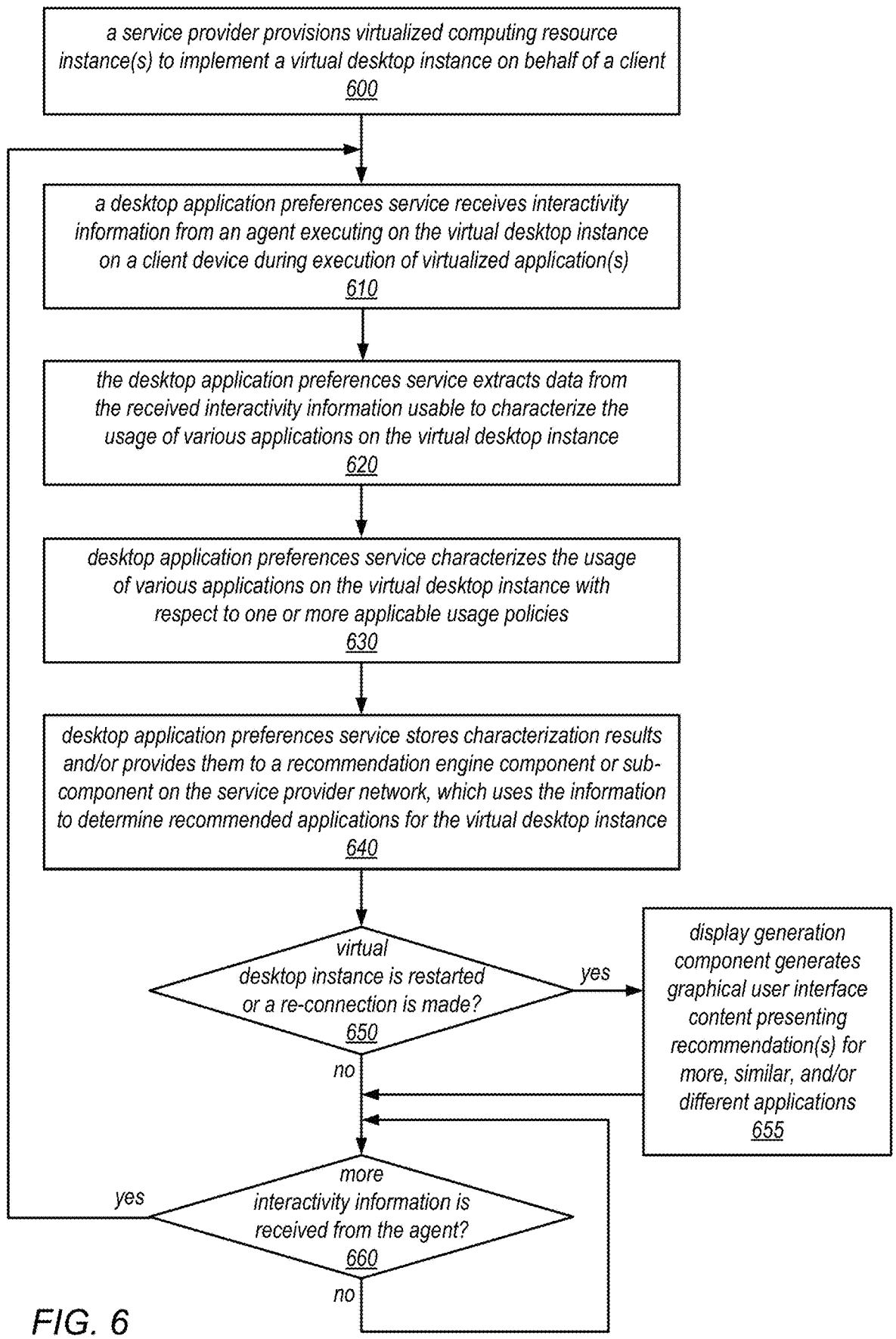
FIG. 6 is a flow diagram illustrating one embodiment of a method for determining application preferences and/or recommending applications for a particular virtual desktop instance.

One embodiment of a method for determining application preferences and/or recommending applications for a particular virtual desktop instance is illustrated by the flow diagram in FIG. 6. As illustrated at 600, in this example, the method may include a service provider provisioning one or virtualized computing resource instances to implement a virtual desktop instance on behalf of a client. The method may include a desktop application preferences service (e.g., one executing on a service provider network that provides virtualized computing services) receiving interactivity information from an agent executing on the virtual desktop instance on a client device during execution of one or more virtualized applications, as in 610. For example, in some embodiments, a desktop application preferences service may receive interactivity data from an interactivity agent executing on a virtual desktop instance and may save it (e.g., in association with a unique identifier of the virtual desktop instance) for subsequent analysis.

As illustrated in this example, the method may include the desktop application preferences service extracting data from the received interactivity information that is usable to characterize the usage of various applications on the virtual desktop instance (as in 620). The method may also include the desktop application preferences service characterizing the usage of various applications and/or the documents/files that are the targets of those applications on the virtual desktop instance with respect to one or more applicable preferences policies (some of which may be dependent on the values of one or more configurable parameters whose values are set by an IT administrator of a customer organization on whose behalf the virtual desktop instance was provisioned), as in 630.

In some embodiments, the method may include the desktop application preferences service storing the characterization results (e.g., in a secure storage location on service provider resources) for subsequent analysis and/or providing them directly to a recommendation engine component (or a recommendation engine sub-component of the desktop application preferences service) on the service provider network, which uses that information to determine one or more recommended applications for use on the virtual desktop instance as in 640. In some embodiments, the desktop application preferences service may perform a characterization periodically (e.g., generating application preferences information on a pre-determined schedule or at pre-determined time intervals) or may perform an iteration of the characterization (and generating a respective preference decision) each time it receives additional data. In various embodiments, the characterizations may take into account cumulative interactivity information for the virtual desktop instance over the long term (e.g., over the lifetime of the virtual desktop instance) and/or interactivity information collected during a sliding window of time having a fixed duration (e.g., in which case it may perform a characterization each the time window expires).

As illustrated in this example, if and when, at some point in the future, the virtual desktop instance is restarted or a re-connection to the virtual desktop is made (e.g., following a crash of the client's computing device, the end user logging out or another type of discontinuation or disconnection), the method may include a display generation component generating a graphical user interface (or content therefor) that presents one or more recommendation for more, similar, and/or different desktop applications for the virtual desktop instance, where the content presented is dependent on the characterization results. This is illustrated in FIG. 6 by the positive exit of 650 and element 655.

As illustrated in this example, until the virtual desktop instance is restarted or a re-connection to the virtual desktop is made, or after the display generation component generates graphical user interface (or content therefor) presents its recommendations, the method may include waiting for more interactivity information to be received (e.g., from the interactivity agent on the given virtual desktop instance) before taking additional actions. This is illustrated in FIG. 6 by the path from the negative exit of 650 to 660 and by the path from the positive exit of 650 to 655 and then to 660. If and when more interactivity information is received from the interactivity agent on the given virtual desktop instance (shown as the positive exit from 660), the method may include repeating the operations shown in 610-655, as appropriate (e.g., in order to update the characterization of the usage of various applications and/or the documents/files that are the targets of those applications on the virtual desktop instance with respect to the applicable preferences policies and/or generate updated recommendations for other desktop applications).

FIG. 7 illustrates an example display 700 (e.g., a pop-up window, balloon, or other GUI) that includes multiple sections to present two different lists of preferred desktop applications for a particular virtual desktop instance (along with preferred targets of those applications) and a list of recommended applications for the virtual desktop instance. In this example, the two different lists of preferred desktop applications/targets have been determined using two different preference policies. In other embodiments, a GUI generated by a desktop application preferences service (or a component thereof) on behalf of a virtual desktop instance may include more, fewer or different collections of applications and/or application targets for presentation within more, fewer, or differently arranged windows and/or sections thereof. Again note that the recommended applications shown in this figure may be listed in any order, in different embodiments, e.g., in alphabetical order by name or vendor, by application type (e.g., productivity applications, data analysis applications, line-of-business applications, etc.), or using any other ordering criteria. For example, in some embodiments, the format and/or content of what is presented may be dependent on the values of one or more system-wide, customer-specific, enterprise-wide, instance-specific, or user-specified configuration parameters.

In this example, a first section of GUI 700 may present a list of the most recently used applications, along with a list of the target files, documents, or other objects that were most recently accessed by those applications. In at least some embodiments, the list shown in the first section of GUI 700 may be determined by a desktop application preferences service based on collected interactivity information, as described above. In this example, this first section of the GUI also includes a single "launch recent apps" interface mechanism (e.g., a radio button, check box, icon, or other selectable user interface mechanism). Here, selection of the user interface mechanism "launch recent apps" may cause all of the listed applications to be launched, and all of the target documents, files, or objects to be opened within the applications, once launched. In other embodiments, a section of a GUI that presents most recently used applications and/or targets may include check boxes that may be selected in order to opt into or out of the collective launching/opening of the preferred applications and targets thereof for selected items.

In this example, a second section of GUI 700 may present a list of the most used applications (e.g., those for which the cumulative usage is the highest during some period of time), along with a list of the target files, documents, or other objects that were most accessed by those applications during that period of time. In at least some embodiments, the list shown in the second section of GUI 700 may also be determined by the desktop application preferences service based on collected interactivity information, as described above. In this example, this second section of the GUI also includes a single "launch most used apps" interface mechanism (e.g., a radio button, check box, icon, or other selectable user interface mechanism). Here, selection of the user interface mechanism "launch most used apps" may cause all of the listed applications to be launched, and all of the target documents, files, or objects to be opened within the applications, once launched. In other embodiments, a section of a GUI that presents most used applications and/or targets may include check boxes that may be selected in order to opt into or out of the collective launching/opening of the preferred applications and targets thereof for selected items.

In this example, a third section of GUI 700 may present a list of recommendations for desktop applications (e.g., applications that have not been used on the virtual desktop instance or that have not been used recently or for any significant amount of time). In at least some embodiments, this list may have been determined by a desktop application preferences service (or a recommendation engine thereof) based on collected interactivity information, as described above. In this example, each entry on the list includes the name of the recommended application, the vendor for the recommended application, and a check box that may be selected in order to add the recommended application to a collection of applications to be installed in the virtual desktop instance (or to a collection of applications for which installation is to be requested). In this example, selection of the user interface mechanism "install selected apps" may cause all of the listed applications for which the corresponding check box is selected to be installed (or for authorization to install them to be requested). In other embodiments, a section of a GUI that presents a list of recommended applications may include check boxes that may be selected in order to opt out of the collective installation of the recommended applications or may include a single user interface mechanism (e.g., an "install recommended apps") that, when selected, causes all of the recommended applications to be installed on the virtual desktop instance.

Figure 8A:
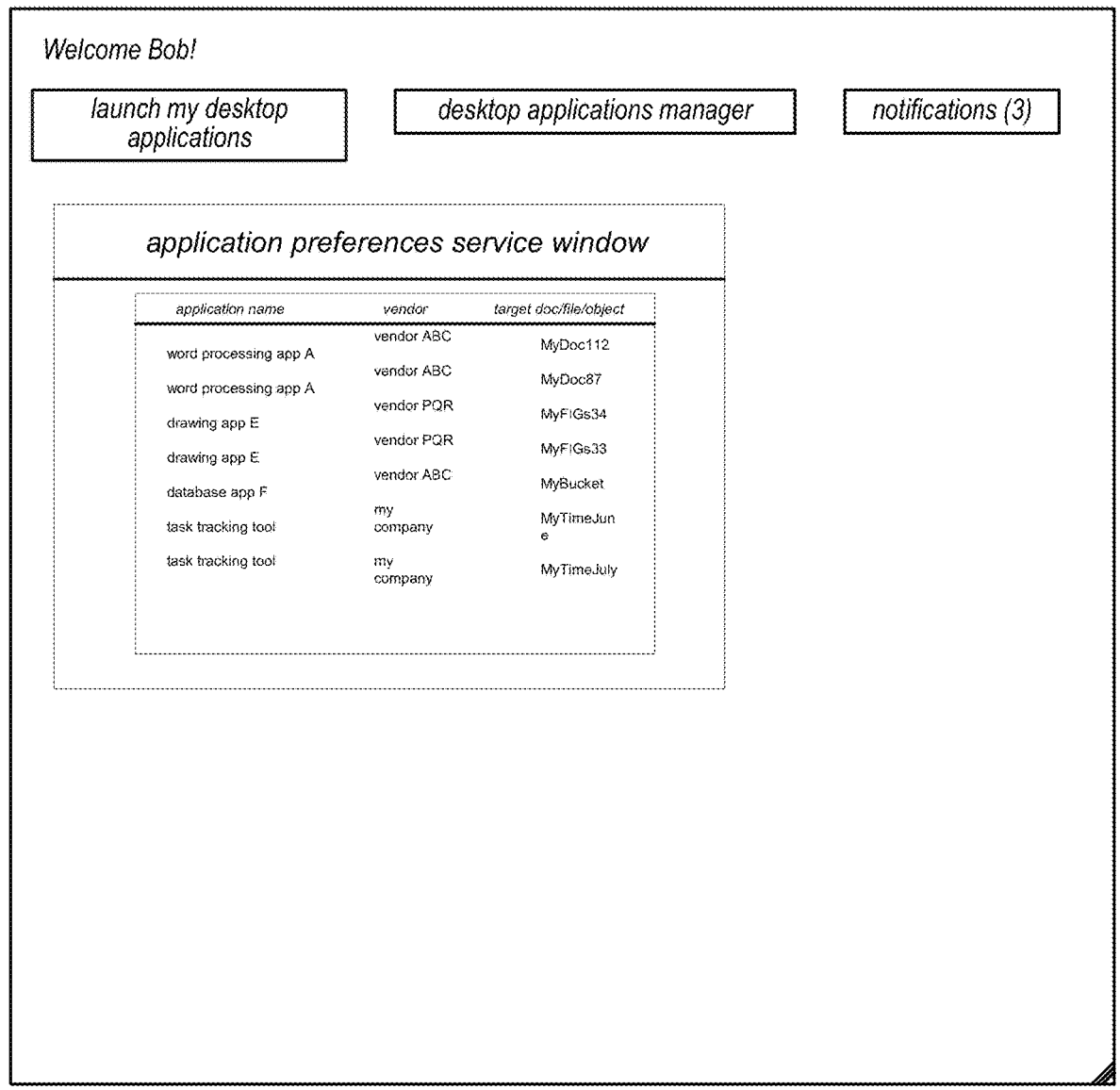
FIGS. 8A-8C illustrate example displays of a desktop application management module GUI, according to different embodiments.

In some embodiments, rather than having a dedicated user interface mechanism (e.g., pop-up windows, balloons, and the like) for presenting preferred applications and their targets to be collectively launched, the functionality of various GUIs associated with the determination, presentation, and launching/opening of preferred applications and their targets, as described herein, may be incorporated into other GUIs presented on the virtual desktop instance. In some embodiments, this functionality may be incorporated into a GUI that also facilitates interaction with a desktop applications manager (such as desktop application management module GUI 133 illustrated in FIG. 1). For example, FIG. 8A illustrates a desktop application management module GUI 800 displayed on a virtual desktop instance that, in response to connection by an end user to the virtual desktop instance, presents within a desktop application preferences service window a list of preferred applications and their targets that is similar to display 500 in FIG. 5A. Other user interface mechanisms presented within GUI 800 include a user interface mechanism for launching/opening the preferred applications and their targets ("launch my desktop applications"), a user interface mechanism for accessing other functionality of a desktop application management module (e.g., "desktop applications manager"), and a user interface mechanisms for viewing any pending notifications ("notifications").

Figure 8B:
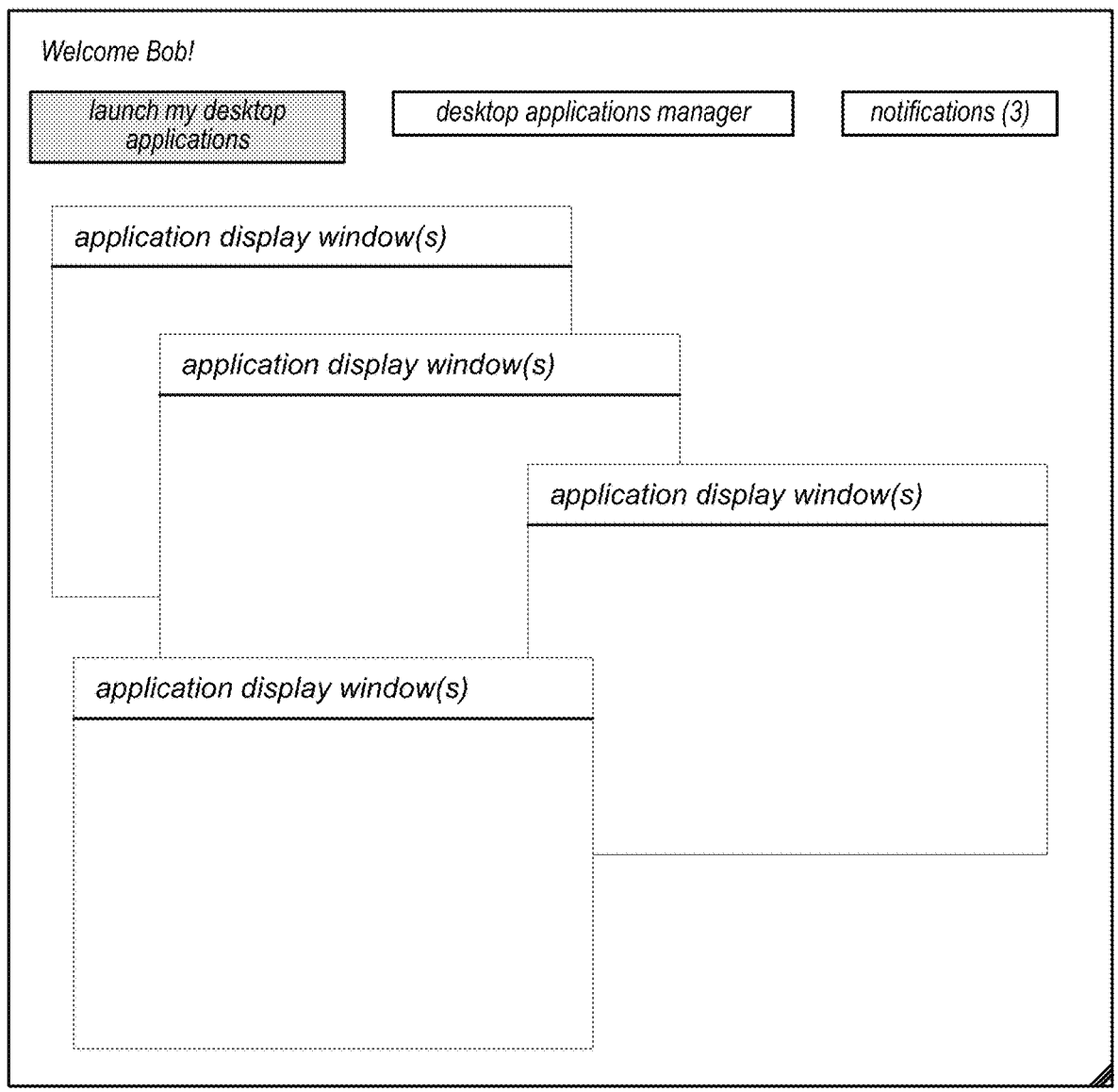

FIG. 8B illustrates desktop application management module GUI 800 following the selection of the user interface mechanism "launch my desktop applications". In this view, in response to the selection of "launch my desktop applications", multiple preferred desktop applications have been launched, and one or more display windows for each of these preferred desktop applications are presented within GUI 800.

Figure 8C:
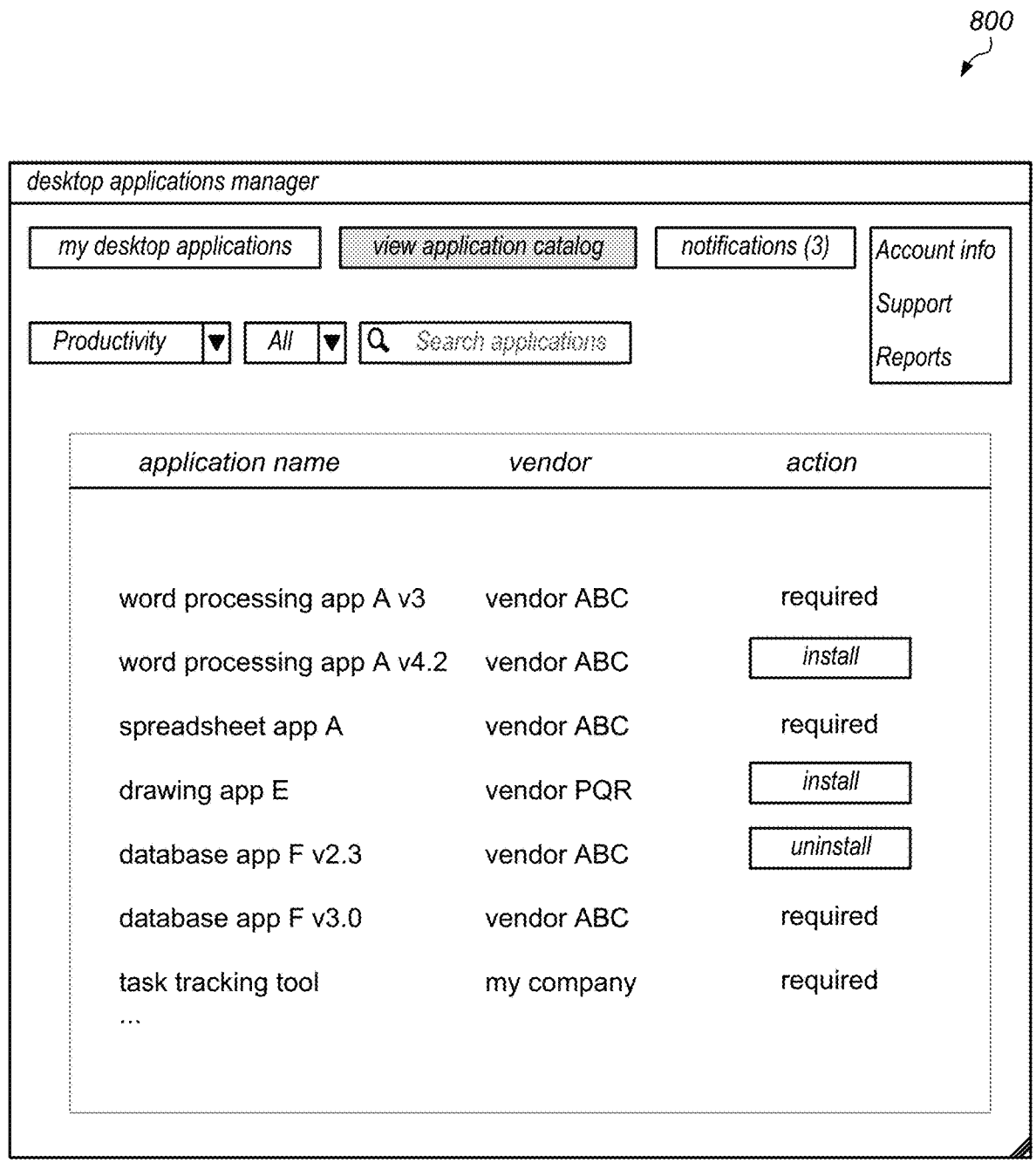

FIG. 8C, on the other hand, illustrates desktop application management module GUI 800 following the selection of the user interface mechanism "desktop applications manager." In this example, an end user has chosen to view applications that are part of a catalog of applications made available to the end user and/or one or more other end users by an IT administrator in the same business, enterprise, or organization ("view application catalog"). In some embodiments, this catalog may include customer-specific line-of-business applications (such as a task tracking tool developed internally by the customer organization), applications developed and/or published by the service provider, and/or applications developed and/or published by someone other than the end user's company or the service provider. In some embodiments, the full application catalog displayed in FIG. 8C may include both customer-specific line-of-business applications, applications developed and/or published by the service provider and/or third party applications that have been assigned to the end user and those that have not been assigned to the end user by their IT administrator (including some for which the business, enterprise, or organization does not yet have a subscription or license). In some embodiments, a recommendation engine within a desktop application preferences service may be configured to recommend the use (e.g., the purchase, licensing, installation, and/or launching) of one or more applications within the full application catalog that are not currently available or assigned to the end user, as described herein.

In this example, in response to the selection of "view application catalog", a list of applications is presented to the end user. In this example, the list of applications indicates, for each application, an application name, the vendor from which the application is sourced, and an available action that can be taken for the application (e.g., "install", for an application that is not currently installed on the end user's computing resource instance, or "uninstall", for some of the applications that are currently installed on the end user's computing resource instance). Note that for several of the applications, the action is shown as "required." This may indicate that these applications must be installed on the end user's computing resource instance (e.g., they may have been installed automatically when the computing resource instance was configured or when the desktop application management module was launched) and cannot be uninstalled (until and unless this requirement changes). As in other examples, the applications may be listed in any order, in different embodiments, e.g., in alphabetical order by name or vendor, by application type (e.g., productivity applications, data analysis applications, line-of-business applications, etc.), by cumulative usage, by date/time of most recent usage, or using any other ordering criteria. As illustrated in this example, the end user may have the option to search the list of applications in order to display specific ones of the applications in the user interface for the desktop application management module, in some embodiments.

Note that, as was also illustrated both FIG. 8A and FIG. 8B, in some embodiments, the end user may also have the option to view "notifications" through the user interface of the desktop application management module. For example, the end user may receive a notification when a new application is made available to the end user individually, is added to a catalog of applications that are assigned or otherwise to the end user or is added to the full application catalog, or when a new generation or version of an application to which the end user is currently subscribed is made available. In some embodiments, the end user may receive a notification when a collection of preferred applications and/or targets thereof has been determined by the desktop application preferences service and/or when a recommendation for one or more applications has been generated by a recommendation engine of the desktop application preferences service, and display similar to those illustrated in FIGS. 5A-5C or FIG. 7 may be presented within GUI 800 in response to selection of such a notification (not shown). As illustrated in this example, in some embodiments, the end user may request one or more reports (e.g., through selection of the "Reports" item in GUI 800). In some embodiments, these reports (which provide usage information for various applications and/or targets thereof) may be generated on demand (e.g., in response to requests from an IT administrator or end user) or periodically, and may be presented to an IT administrator or end user when they are generated or upon request, according to various embodiments. In some embodiments, the format and/or content of what is presented within GUI 800 at various times may be dependent on the values of one or more system-wide, customer-specific, enterprise-wide, instance-specific, or user-specified configuration parameters.

Figure 9:
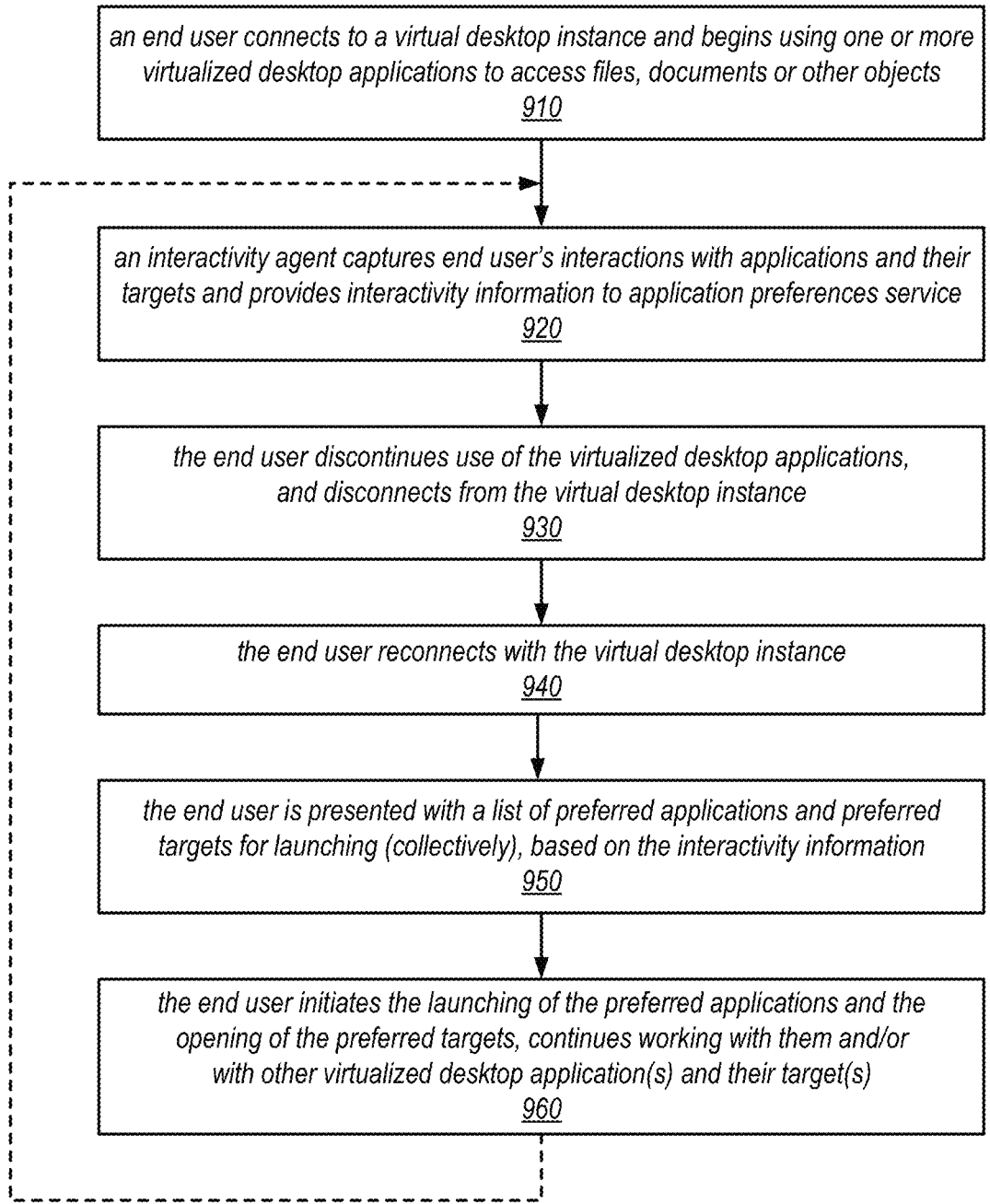
FIG. 9 is a flow diagram illustrating one embodiment of a method for systems to employ the techniques described herein.

FIG. 9 is a flow diagram illustrating one example of a method for systems to employ the techniques described herein, according to at least some embodiments. As illustrated at 910, in this example, the method may include an end user connecting to a virtual desktop instance and beginning to use one or more virtualized desktop applications to access particular files, documents or other objects. The method may include an interactivity agent capturing the end user's interactions with the applications and their targets (e.g., the files, documents or other objects accessed by those desktop applications) and providing interactivity information to an application preferences service, as in 920. For example, in some embodiments, an agent executing within a virtual desktop environment on a client device may collect interactivity information associated with the execution of one or more virtualized applications (e.g., during a particular virtual desktop session), and may provide the interactivity information to a desktop application preferences service executing on a service provider network (e.g., a service provider network that includes computing resources that are collectively configured to provide virtual computing services to customer or service subscribers).

As illustrated in this example, the method may include, in response to the end user discontinuing the use of the virtualized desktop applications and disconnecting from the virtual desktop instance, and subsequently reconnecting with the virtual desktop instance (e.g., logging out and then logging back in, as in 930 and 940), presenting the end user with a list of preferred applications and preferred targets for those applications to be launched (collectively), based on the interactivity information (as in 950). The method may include the end user initiating the launching of the preferred applications and the opening of the preferred targets and then continuing to work with them and/or with other virtualized desktop applications and their targets, as in 960.

As illustrated in this example, while the end user repeatedly connects to the virtual desktop instance, performs some work, and then disconnects from the virtual desktop, the operations shown as 920-960 may be repeated (e.g., indefinitely), and each time the end user reconnects to the virtual desktop instance, they may be presented with a list of preferred applications and preferred targets for those applications to be launched (collectively), based on the cumulative and/or most recently collected interactivity information. This is illustrated in FIG. 9 by the dashed line from 960 to 920. Note that it may or may not be the case that the application preferences and/or targets change each time the end user reconnects to the virtual desktop instance. Instead, whether or not the preferences change between virtual desktop sessions may be dependent on the interactivity information that is collected and/or on the preference policies that are applied during the characterization of the interactivity information. For example, even if additional interactivity information is taken into account, the "most recently uses" and/or "most used" applications and/or targets may not change between a given pair of virtual desktop sessions.

As previously noted, in some embodiments, the systems described herein may be configured to store application state data and/or scratch data generated by a given one of the desktop applications in the collection of preferred desktop applications to a secure location on the service platform. In such embodiments, if the given desktop application needs to be reinstalled (e.g., subsequent to a failure or re-provisioning of the virtual desktop instance), the application state data and/or scratch data may be retrieved from the secure location and attached to the given desktop applications subsequent to is reinstallation.

Note that while numerous examples included herein describe techniques for identifying, presenting, and launching a collection of preferred desktop applications (e.g., virtualized desktop applications) on virtual desktop instances based on captured interactivity data, in other embodiments, these techniques may be applied to identify, present, and launch a collection of preferred applications that includes one or more preferred internet applications (e.g., instead of, or in addition to, preferred desktop applications). For example, if an end user connects to a third party service from within a virtual desktop instance (e.g., a service other than the one that provides the virtual desktop instance) to execute one or more applications over the internet, an interactivity agent executing on the virtual desktop instance may be configured to capture interactivity information associated with the execution of those internet application and to provide it to an application preferences service (one that is not limited to the analysis of data associated with the execution of desktop applications). The application preferences service may be configured to identify, based at least in part on the interactivity data, one or more preferred internet applications in a manner similar to that used to identify preferred desktop applications (e.g., by determining which internet applications are used most and/or most recently) and/or may be configured to identify, based at least in part on the interactivity data, one or more preferred targets for the internet applications executed by the end user. In some embodiments, internet applications that are identified as preferred applications may be launched collectively using mechanisms that are similar to those described herein for launching collections of preferred desktop applications. In various embodiments, information indicating a collection of preferred internet applications and/or targets thereof may be identified and/or displayed separately from information indicating a collection of preferred desktop applications and/or targets thereof, or these two types of preferred application collections may be treated as a single collection of preferred applications for the purposes of identification, presentation, selection, and/or launching.

In some embodiments, some or all of the graphical user interfaces (or user interface elements thereof) may be presented to an end user on a mobile device, whether or not the mobile device is the computing device on which the client-side portions of the corresponding virtual desktop instance is installed and on which the end user performs the majority of their work. For example, while a virtual desktop session is being brought up on a laptop or desktop computer, a notification window or other GUI may be presented to the end user on a smart phone or tablet device that presents a list of preferred applications/targets and options for launching them. In this example, the end user may elect to launch all of them by selecting one user interface mechanism (a single "launch" mechanism) or may select a subset of them by checking or unchecking boxes associated with each application/target pair prior to selecting a "launch" mechanism. In some embodiments, different versions of a preferred application may be configured for execution on different platforms (e.g., on a laptop/desktop device and on a mobile device). In some such embodiments, a GUI on a first platform may be accessed in order to select and launch applications on a second platform, and vice versa.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances.

Figure 10:
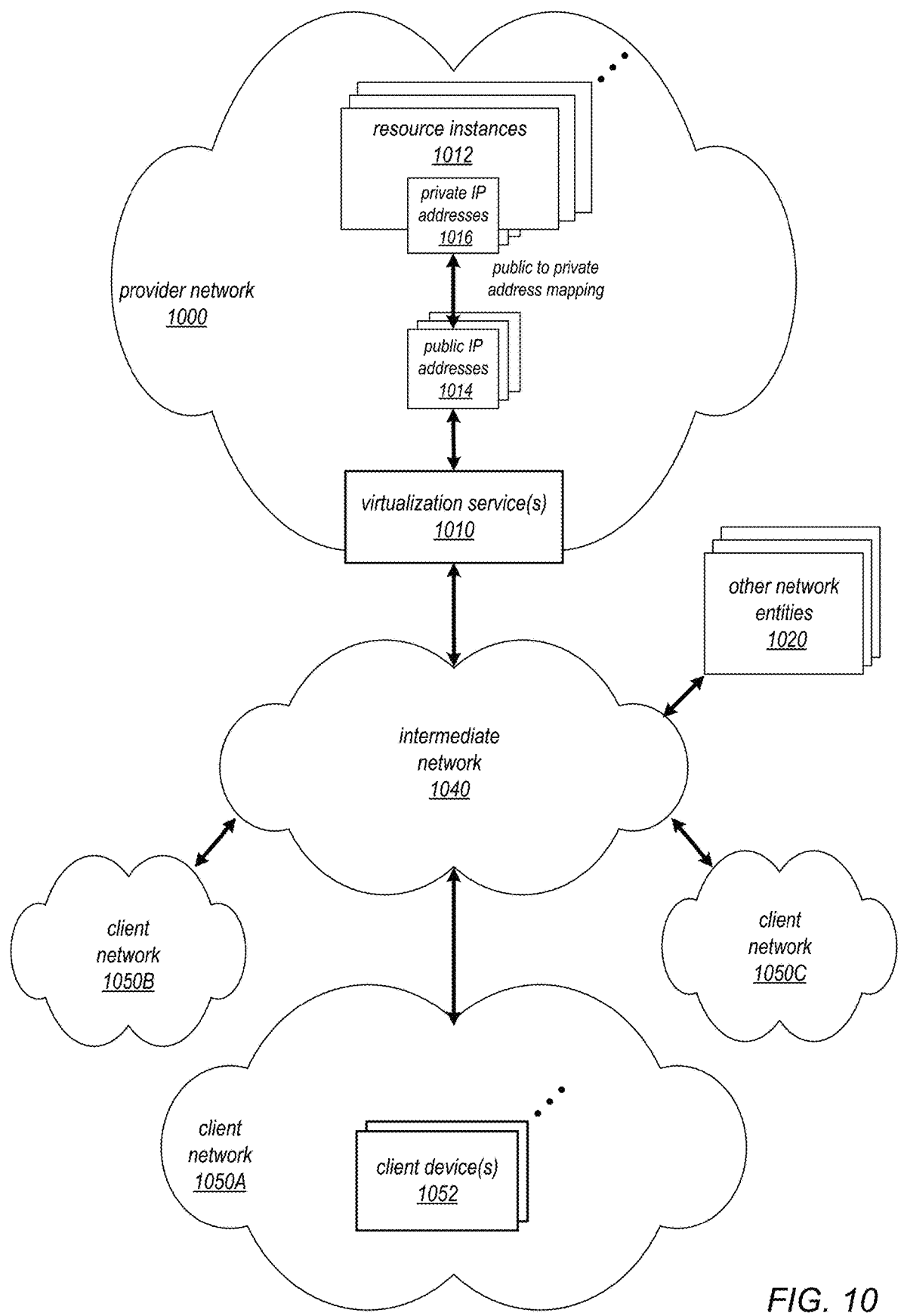
FIG. 10 is a block diagram illustrating an example provider network environment, according to at least some embodiments.

FIG. 10 illustrates an example provider network environment on which techniques described herein for identifying, presenting, and launching preferred desktop applications on virtual desktop instances based on captured interactivity data may be implemented, in at least some embodiments. In this example, a provider network 1000 may provide resource virtualization to clients via one or more virtualization services 1010 that allow clients to purchase, rent, or otherwise obtain instances 1012 of virtualized resources, including but not limited to computation and storage resources, implemented on devices within the provider network or networks in one or more data centers. As described in more detail herein, in some embodiments, provider network 1000 may also provide application virtualization for the benefit of its customers and their end users, and may provide on-demand delivery of desktop applications to desktops on physical computing devices and/or virtual desktops through an application fulfillment platform implemented using various resources of service provider network 1000. Private IP addresses 1016 may be associated with the resource instances 1012; the private IP addresses are the internal network addresses of the resource instances 1012 on the provider network 1000. In some embodiments, the provider network 1000 may also provide public IP addresses 1014 and/or public IP address ranges (e.g., Internet Protocol version 4 (IPv4) or Internet Protocol version 6 (IPv6) addresses) that clients may obtain from the provider 1000.

Conventionally, the provider network 1000, via the virtualization services 1010, may allow a client of the service provider (e.g., a client that operates client network 1050A, 1050B, or 1050C, each of which may include one or more client devices 1052) to dynamically associate at least some public IP addresses 1014 assigned or allocated to the client with particular resource instances 1012 assigned to the client. The provider network 1000 may also allow the client to remap a public IP address 1014, previously mapped to one virtualized computing resource instance 1012 allocated to the client, to another virtualized computing resource instance 1012 that is also allocated to the client. For example, using the virtualized computing resource instances 1012 and public IP addresses 1014 provided by the service provider, a client of the service provider such as the operator of client network 1050A may implement client-specific applications and present the client's applications on an intermediate network 1040, such as the Internet. Other network entities 1020 on the intermediate network 1040 may then generate traffic to a destination public IP address 1014 published by the client network 1050A; the traffic is routed to the service provider data center, and at the data center is routed, via a network substrate, to the private IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 1000; a client may then assign their allocated public IP addresses to particular resource instances allocated to the client. These public IP addresses may be referred to as client public IP addresses, or simply client IP addresses. Instead of being assigned by the provider network 1000 to resource instances as in the case of standard IP addresses, client IP addresses may be assigned to resource instances by the clients, for example via an API provided by the service provider. Unlike standard IP addresses, client IP addresses may be allocated to client accounts and remapped to other resource instances by the respective clients as necessary or desired. In some embodiments, a client IP address is associated with a client's account, not a particular resource instance, and the client controls that IP address until the client chooses to release it. Unlike conventional static IP addresses, client IP addresses may allow the client to mask resource instance or availability zone failures by remapping the client's public IP addresses to any resource instance associated with the client's account. The client IP addresses, for example, may enable a client to engineer around problems with the client's resource instances or software by remapping client IP addresses to replacement resource instances.

Note also that in some embodiments, the resource instances 1012 that are made available to clients (e.g., client devices 1052) via virtualization service(s) 1010 may include multiple network interfaces. For example, some of them may include one network interface for communicating with various components of a client network 1050 and another network interface for communicating with resources or other network entities on another network that is external to provider network 1000 (not shown).

Figure 11:
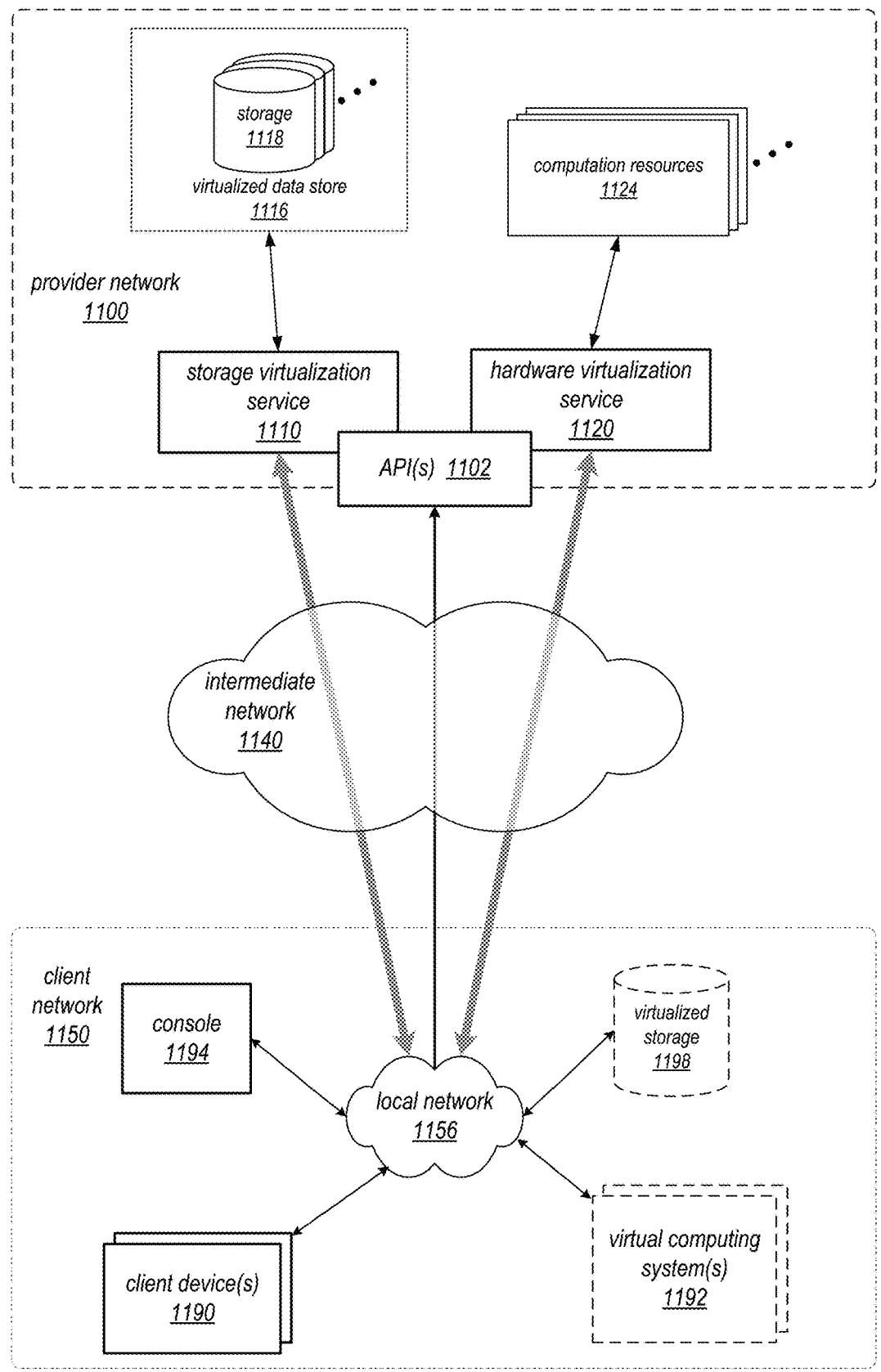
FIG. 11 is a block diagram illustrating an example provider network that provides a storage virtualization service and a hardware virtualization service to clients, according to at least some embodiments.

FIG. 11 is a block diagram of another example provider network environment, one that provides a storage virtualization service and a hardware virtualization service to clients and that may implement the techniques described herein for identifying, presenting, and launching preferred desktop applications on virtual desktop instances based on captured interactivity data, according to at least some embodiments. In this example, hardware virtualization service 1120 provides multiple computation resources 1124 (e.g., VMs) to clients. The computation resources 1124 may, for example, be rented or leased to clients of the provider network 1100 (e.g., to a client that implements client network 1150). As noted in the previous example, in some embodiments, provider network 1100 may also provide application virtualization for the benefit of its customers and their end users, and may provide on-demand delivery of desktop applications to desktops on physical computing devices and/or virtual desktops through an application fulfillment platform implemented using various resources of service provider network 1100. In this example, each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access one or more storage volumes 1118 of virtual data store 1116, each of which appears to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network. Note that in some embodiments, the hardware virtualization service 1120 may be configured to provide computation resources 1124 that have been configured to implement a virtual desktop instance, which may appear to the user as a local desktop (implemented by a virtual computing system 1192). Note also that in some embodiments, the computation resources 1124 that are made available to the client via hardware virtualization service 1120 may include multiple network interfaces. For example, some of them may include one network interface for communicating with various components of client network 1150 and another network interface for communicating with computation resources or other network entities on another network that is external to provider network 1100 (not shown).

In some embodiments, various components of a service provider network (e.g., one that implement the techniques described herein for identifying, presenting, and launching preferred desktop applications on virtual desktop instances based on captured interactivity data) may be configured for the generation and management of remote computing sessions between client computing devices and virtual desktop instances hosted by one or more remote data center computers of a Program Execution Service (PES) platform. A number of data centers may be organized as part of a single PES platform that can facilitate the utilization of resources of the data centers by customers of the PES. In some embodiments, the PES may include several hundreds or thousands of data center computers. For example, in some embodiments, client computing devices may access the virtual desktop instances during one or more remote computing sessions, and a virtual desktop instance may provide a user with all of the capabilities of a client desktop environment but with centralized provisioning of the services accessed by the client.

In some embodiments, a user, via a client computing device, may transmit a request to load an application such as a remote computing application. Subsequent to the receipt of the request, the client computing device may communicate with a PES platform to start a remote computing session. In one embodiment, the communication between the client computing device and the PES platform may include login information. In other embodiments, the communication may also include information identifying resource usage information, processing requirements, or rules regarding the duration or conditions of the remote computing session for the user of the client computing device. The client computing device may further communicate various information relating to the device state, including, but not limited to, a current or future availability of device resources (e.g., processing power, memory, storage, network usage, etc.). Using the information received, the PES platform may identify one or more virtual desktop instances for execution in one or more remote computing sessions. In one example, the PES platform may instantiate, or cause to have instantiated, a virtual machine instance on a data center computer, and the virtual machine instance may include an operating system. The client computing device may then establish a remote computing session with the virtual machine, and the user interface of the operating system (e.g., the output of the operating system, such as a graphical user interface, sound, etc.) may be sent to the client computing device via a particular network interface of the virtual machine instance or virtual desktop instance and presented to the user (e.g., the graphical user interface may be rendered on a display of the client computing device). The operating system may use a desktop profile associated with the user and stored on a desktop store accessible by the PES to configure the virtual desktop instance for the user by setting the desktop background, screen saver, desktop layout, pointer preferences, sound settings, and the like. User input such as mouse and keyboard activity (which may be captured by an interactivity agent) may then be sent to the virtual machine (via a particular network interface of the virtual machine instance or virtual desktop instance) and injected into the operating system as if the activity was performed by a user directly at the virtual machine.

In some embodiments, the PES platform may receive or generate data associated with the interaction of the client computing device with the virtual desktop instance on the client computing device during the remote computing session. The data may include user data and preferences, files, and the like. Upon receiving the data, the PES platform may save the data to the desktop store associated with the virtual desktop instance. In some embodiments, the desktop store may be implemented on a volume, or on another logical block storage device. In some embodiments, the PES may create a backup copy of the data or also store the data to a central repository. The saved data may then be used to restore remote computing sessions that have been interrupted due to a failure, such as a failure of the virtual desktop instance, the server hosting the virtual desktop instance, the network, etc. By saving the user data, the PES platform may ensure that the re-establishment of a remote computing session occurs with minimal delay and disruption to a user of a client computing device.

In some embodiments, the virtual desktop instance provided may be configured according to a user profile stored at a user profile store of the PES. The configuration of the virtual desktop instance may also be adjusted according to monitored usage of the instance. In some embodiments, the user profile may be set by an administrator associated with an entity governing the user's use. The user profile may indicate various memory and processing requirements associated with the PES computers executing the one or more virtual desktop instances as well as requirements for the virtual desktop instances. For example, the user profile may indicate the programs to which the user is given while using the virtual desktop instance. In some embodiments, this may include one or more desktop applications that are packaged as virtualized application packages and that are provided on-demand through an application fulfillment platform implemented on resources of the service provider network. In some embodiments, the user profile may include an indication of the preferred applications and corresponding targets that have been identified by a desktop application preferences service, as described herein. The user profile may also indicate a maximum time or cost associated with the remote computing session. The PES may take a user profile for the user into consideration when placing and configuring the virtual desktop instances. In addition, placement and configuration decisions may also be adjusted based on a user's interaction with the virtual desktop over time.

Figure 12:
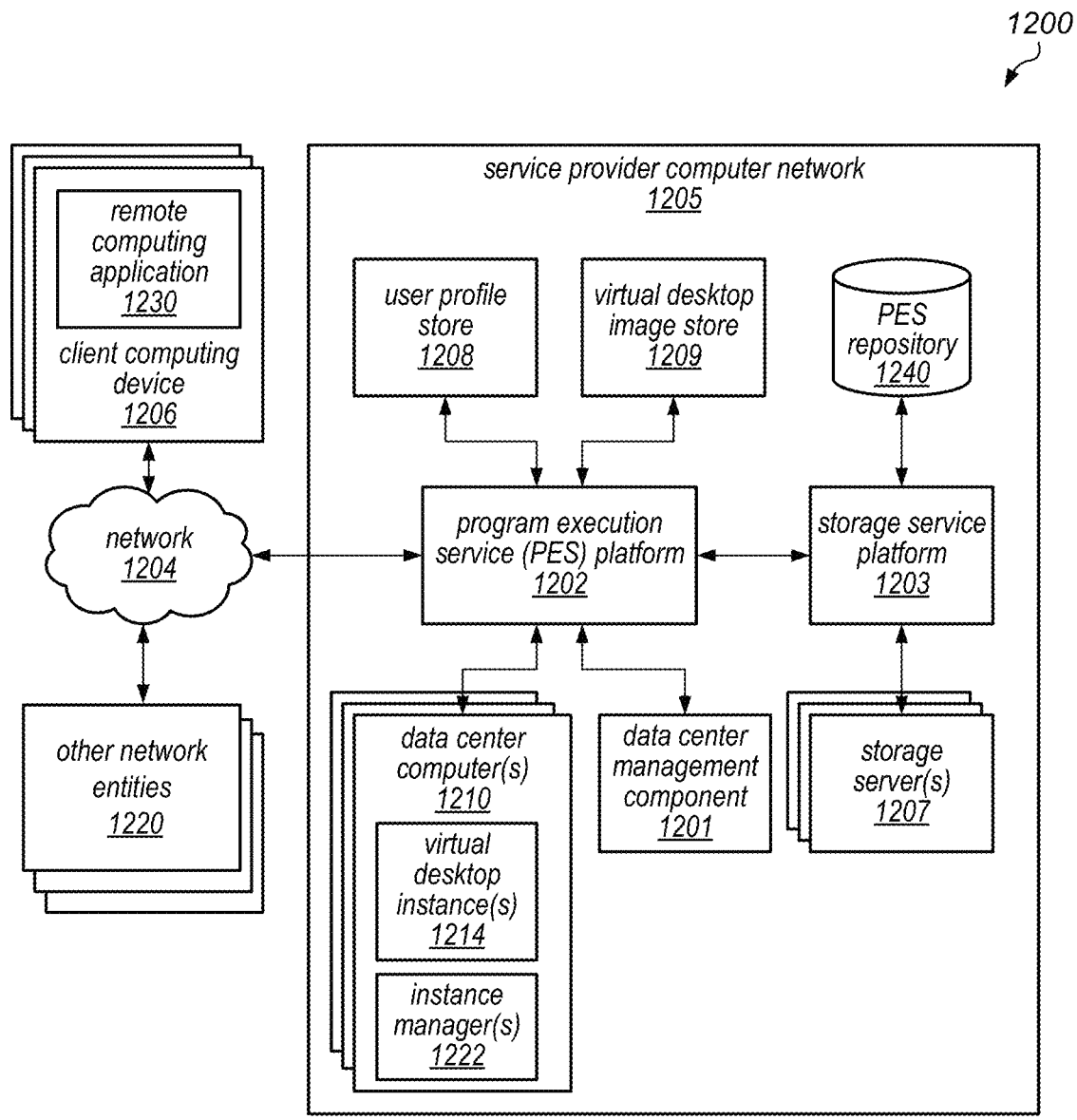
FIG. 12 is a block diagram illustrating a networked computing environment that includes a client computing device in communication with a service provider computer network, according to at least some embodiments.

FIG. 12 is a block diagram illustrating an example networked computing environment 1200 that includes a client computing device 1206 in communication with a service provider computer network 1205 via the communication network 1204. The client computing device 1206 may be used for providing access to a remote operating system and applications to a user. In various embodiments, the client computing device 1206 may correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In some embodiments, the client computing device 1206 includes necessary hardware and software components for establishing communications over a communication network 1204, such as a wide area network or local area network. For example, the client computing device 1206 may be equipped with networking equipment and browser software applications that facilitate communications via the Internet or an intranet. The client computing device 1206 may have varied local computing resources such as central processing units and architectures, memory, mass storage, graphics processing units, communication network availability and bandwidth, etc.

In one embodiment, the client computing device 1206 may run a remote computing application 1230. The remote computing application 1230 may request access to a virtual desktop instance hosted by the service provider computer network 1205. The remote computing application 1230 may also manage the remote computing session between the client computing device 1206 and the service provider computer network 1205. As illustrated in FIG. 12, the service provider computer network 1205 may also include a PES platform 1202. The PES platform 1202 illustrated in FIG. 12 corresponds to a logical association of one or more data centers associated with a service provider. The PES platform 1202 may be associated with a number of data center computers, such as, for example, data center computers 1210. Each data center computer 1210 may host one or more virtual desktop instances 1214. For example, the data center computer 1210 may host a virtual desktop instance by executing a virtual machine on a physical device. The virtual machine may execute an instance of an operating system and application software to create a virtual desktop instance. Each virtual desktop instance executed by the PES 1202 may be accessed by one or more client computing devices, such as client computing device 1206.

In some embodiments, data center computers 1210 may be associated with private network addresses, such as IP addresses, within the service provider computer network 1205 such that they may not be directly accessible by the client computing devices 1206. The virtual desktop instances 1214 may be associated with public network addresses that may be made available by a gateway at the edge of the service provider computer network 1205. Accordingly, the virtual desktop instances 1214 may be directly addressable by client computing devices 1206 via the public network addresses. One skilled in the relevant art will appreciate that each data center computer 1210 would include physical computing device resources and software to execute the multiple virtual desktop instances 1214 or to dynamically instantiate virtual desktop instances 1214. Such instantiations can be based on a specific request, such as from the client computing device 1206.

As illustrated in FIG. 12, the data center computers 1210 may include one or more instance managers 1222. The instance managers 1222 may be on the same computer as the respective instances 1214, or on a separate computer. The instance managers 1222 may track progress of the instances executed on the data center computers 1210, monitor and coordinate the storage of data created by the user while interacting with the instances 1214 via the client computing devices, and monitor the overall health and state of the data center computers 1210 and of the remote computing applications running on the client computing devices 1206. The instance managers 1222 may communicate information collected through tracking and monitoring with the data center management component 1201 of the PES platform 1202 in order to efficiently manage the various remote computing sessions between the data center computers 1210 and the client computing devices 1206. In some embodiments, a desktop application preferences service may be included as a sub-component within the data center management component 1201 or within another component of the PES platform 1202. In other embodiments, the data center management component 1201 or another component of the PES platform 1202 may include a display generation component, a recommendation engine and/or an interactivity agent, such as those described herein.

As illustrated in FIG. 12, the service provider network 1205 may also include a storage service platform 1203. The storage service platform 1203 may include, or be connected to, one or more storage servers 1207. The storage servers 1207 may be used for storing data generated or utilized by the virtual desktop instances 1214. The data generated or utilized by the virtual desktop instances 1214 may be based on the interaction between the client computing devices 1206 and the PES 1202 via one or more remote computing sessions.

In some embodiments, the storage service platform 1203 may logically organize and maintain information associated with a hosted virtual desktop instance 1214 in a desktop store. The information associated with a virtual desktop instance 1214 maintained in the desktop store may include, but is not limited to, user preferences, user or customer-specific policies, information associated with the execution of program data, user content, references to user content, and the like. For example, folders used by the user to store music, files, and the like on other storage devices, including through storage service providers, may also be mapped to the desktop store via references to those storage locations. That is to say, input/output operations, such as requests to open files in these folders, can be redirected to the desktop store. Thus, when a user attempts to open a file stored in his or her document folder, the request can be redirected by the operating system running in the virtual desktop instance to the desktop store. In addition to the data created by the user, the user's desktop profile, which may include, for example, configuration information for the desktop such as the background picture, fonts, arrangement of icons, and the like, may also be stored on the desktop store associated with the user's virtual desktop instance. In some embodiments, the service provider computer network 1205 may be able to mitigate the effect of failures of the data center computer(s) 1210 running the virtual desktop instances 1214 or errors associated with the execution of virtual desktop instances 1214 on the data center computer(s) 1210 by storing data on storage servers independent from the data center computers 1210. Additionally, the service provider network 1205 may also facilitate client interaction with multiple virtual desktop instances 1214 by maintaining the information in the desktop stores. In some embodiments, if one virtual desktop instance 1214 fails, a new instance may be launched and attached to the same desktop store that was previously attached to the virtual desktop instance 1214 that failed.

In various embodiments, the desktop stores may be distributed across multiple servers, they may be replicated for performance purposes on servers in different network areas, or they may be replicated across multiple servers with independent failure profiles for backup or fault performance purposes. For example, the servers may be attached to different power sources or cooling systems, the servers may be located in different rooms of a data center or in different data centers, and/or the servers may be attached to different routers or network switches. In some embodiments, a desktop store may be located on one storage server, and changes made to the desktop store may be replicated to another desktop store on a different storage server. Such replication may create a backup copy of the user's data. If the desktop store fails or the virtual desktop instance 1214 loses its connection to the desktop store, the PES 1202 may switch the connection of the virtual desktop instance 1214 from the desktop store to the back-up desktop store.

As illustrated in FIG. 12, the PES platform 1202 may also include a central storage device such as a PES repository 1240 for storing data stored by the various desktop stores and backup stores on storage servers 1207. The data center computers 1210 and the storage servers 1207 may further include additional software or hardware components that facilitate communications including, but not limited to, load balancing or load sharing software/hardware components for selecting instances of a virtual machine supporting a requested application and/or providing information to a DNS name server to facilitate request routing.

As illustrated in this example, the service provider computer network 1205 may include a user profile store 1208. The user profile store 1208 may be used to store, for example, various programs a user is given access to while using a virtual desktop instance 1214. In some embodiments, this may include one or more desktop applications that are packaged as virtualized application packages and that are provided on-demand through an application fulfillment platform implemented on resources of the service provider network 1205. The user profiles stored may also indicate a maximum time or cost associated with the remote computing sessions of different users. The PES platform 1202 may take user profiles into consideration when placing, configuring, and/or managing virtual desktop instances 1214. The PES platform 1202 may also include, or be connected to, a virtual desktop image store 1209. The virtual desktop image store 1209 may include template images of operating systems without customizations applied per user profiles.

In some embodiments, data center computers 1210 and storage servers 1207 may be considered to be logically grouped, regardless of whether the components, or portions of the components, are physically separate. For example, a service provider computer network 1205 may maintain separate locations for providing the virtual desktop instances 1214 and the storage components. Additionally, although the data center computers 1210 are illustrated in FIG. 12 as logically associated with a PES platform 1202, the data center computers 1210 may be geographically distributed in a manner to best serve various demographics of its users. Additionally, one skilled in the relevant art will appreciate that the service provider computer network 1205 may be associated with various additional computing resources, such additional computing devices for administration of content and resources, and the like. For example, the service provider computer network 1205 (and/or various ones of the virtual desktop instances 1214 implemented thereon) may be configured to communicate with other network entities 1220 over communication network 1204 or over another communication network (e.g., at least some of the virtual desktop instances 1214 may include a network interface usable to access one or more other network entities 1220 that is separate and distinct from to a network interface that is usable to communicate with client computing device 1206). These other network entities 1220 may include, for example, other client networks or computing devices thereof, computing systems that provide resources for servicing requests received from client computing device 1206, and/or networks or computing devices thereof that access other services, applications, or data over the Internet.

In some embodiments, the processing requirements associated with a user or a client computing device may be determined based on a variety of scenarios. In some embodiments, the determination may be based on a user request at launching of the remote computing application 1230. For example, the user may be presented with a graphical user interface (GUI) displaying a variety of options for resources and applications. The user may then select the applications they wish to have access to, or, alternatively, the version of those applications. For example, one user may wish to access a basic version of an application while another user may wish to access a professional version of the same application. The determination may also be based on pre-selected options for certain users as determined by administrators of entities associated with the users. For example, the pre-selected options may be presented to the user as a list of different packages of applications to which the user may wish to have access. In some cases, the determination may be made on historical usage data of a user, which the PES platform 1202 may determine once the request is received from the user. In other cases, the determination of the processing requirements may be based on ongoing monitoring of use of processes by the user once the remote computing session is initiated. In such cases, the selection of adequate resource instances may be dynamically changed after the session is established, and the dynamic change over to new instance(s) may be performed as described with respect to FIG. 12 above. In some embodiments, the user may be presented with a list of preferred applications and their corresponding targets, long with options for launching some or all of the (e.g., collectively), as described herein. In some embodiments, the remote computing application 1230 may request that a virtual desktop session be opened on behalf of the client, in response to which a virtual desktop instance 1214 may be instantiated, configured for the use of the client, and/or connected to the client computing device 1206 over network 1204 (e.g., via a network interface of the virtual desktop instance 1214).

In some embodiments, a service provider network that implements VMs and VMMs may use Internet Protocol (IP) tunneling technology to encapsulate and route client data packets over a network substrate between client resource instances on different hosts within the provider network. The provider network may include a physical network substrate that includes networking devices such as routers, switches, network address translators (NATs), and so on, as well as the physical connections among the devices. The provider network may employ IP tunneling technology to provide an overlay network via which encapsulated packets (that is, client packets that have been tagged with overlay network metadata including but not limited to overlay network address information for routing over the overlay network) may be passed through the network substrate via tunnels or overlay network routes. The IP tunneling technology may provide a mapping and encapsulating system for creating the overlay network on the network substrate, and may provide a separate namespace for the overlay network layer (public IP addresses) and the network substrate layer (private IP addresses). In at least some embodiments, encapsulated packets in the overlay network layer may be checked against a mapping directory to determine what their tunnel substrate target (private IP address) should be. The IP tunneling technology may provide a virtual network topology overlaid on the physical network substrate; the interfaces (e.g., service APIs) that are presented to clients are attached to the overlay network so that when a client resource instance provides an IP address to which packets are to be sent, the IP address is run in virtual space by communicating with a mapping service that can determine where the IP overlay addresses are.

In various embodiments, client resource instances on the hosts may communicate with other client resource instances on the same host or on different hosts according to stateful protocols such as Transmission Control Protocol (TCP) and/or according to stateless protocols such as User Datagram Protocol (UDP). However, the client packets are encapsulated according to an overlay network protocol by the sending VMM and unencapsulated by the receiving VMM. A VMM on a host, upon receiving a client packet (e.g., a TCP or UDP packet) from a client resource instance on the host and targeted at an IP address of another client resource instance, encapsulates or tags the client packet according to an overlay network (or IP tunneling) protocol and sends the encapsulated packet onto the overlay network for delivery. The encapsulated packet may then be routed to another VMM via the overlay network according to the IP tunneling technology. The other VMM strips the overlay network encapsulation from the packet and delivers the client packet (e.g., a TCP or UDP packet) to the appropriate VM on the host that implements the target client resource instance. In other words, in some embodiments, although there may be a single underlying physical network in the service provider computing environment (e.g., the service provider data center), the encapsulations described herein may allow it to appear as if each client application (or each client resource instance on which one or more client applications execute) is running on its own virtual network (e.g., data packets for multiple client applications may be traveling on the same physical network but it may appear as if the traffic directed to each of the client applications is traveling on a private network).

In some embodiments, the overlay network may be a stateless network implemented according to a connectionless (or stateless) IP protocol. In some such embodiments, the sending VMM sends the encapsulated packet onto the overlay network for routing and delivery, but does not receive an acknowledgement (ACK) or other response regarding delivery of the packet. In other embodiments, the VMM may receive an ACK or other response regarding delivery of an encapsulated packet.

In some embodiments, while there are physical computers executing client applications and other processes described herein, the client applications may be running as virtual machines on the physical computers. For example, internal processes of the cloud computing environment that are configured to manage the creation of these virtual machines, to provision resources for these virtual machines, and/or to perform other administrative tasks on behalf of clients and/or their applications (e.g., monitoring resource usage, customer accounting, billing for services, etc.) may execute in a control plane layer (or hypervisor) in the cloud computing environment. By contrast, client applications (e.g., each resource instance that implements an application component) may execute in a data plane layer of the cloud computing environment. Underneath these layers, there may be only one physical network card for each host node (or for multiple host nodes), in some embodiments, but each resource instance may execute as if it has its own network (e.g., a virtual network). In some embodiments, each resource instance may have its own data plane network connection(s), but may make local API calls (e.g., calls to a component on the same node) without needing to rely on these data plane network connections.

In some embodiments, a customer may have an application running on a local machine, but may provision resources instances in a cloud computing environment to be used in case of a failure on the local machine. In some embodiments, multiple resource instances may be executing in a cloud computing environment to implement a distributed application on behalf of a client. In different embodiments, the cloud computing environment may be a multi-tenant environment in which each application (and/or each virtual private network) may have its own namespace. In some embodiments, each client may have its own allocation of network connectivity and/or throughput capacity (bandwidth). For example, the network connectivity and/or throughput capacity in the data plane network may be provisioned (e.g., designated or reserved) for the use of various clients.

In various embodiments, a service provider may employ one of the example provider networks described above (or another suitable provider network environment) to implement a hosted desktop service in a cloud computing environment. In such embodiments, a customer may access the provider network in the cloud computing environment to request the instantiation and/or configuration of one or more virtual desktop instances in the cloud, and may then provide access to those virtual desktop instances to one or more end users (e.g., through a client application). For example, an administrator within an organization or enterprise may set up an account with a service provider, may contract with the service provider to set up some number of virtual desktop instances, and (once the virtual desktop instances are set up), may provide credentials for accessing these virtual desktop instances. In this example, once the virtual desktop instances have been set up and credentials have been provided, one or more end users may launch a client application on their a client device (e.g., a computer, tablet device, or other mobile device) and enter the credentials for the virtual desktop instance, after which they may be logged into a virtual desktop environment. Although the virtual desktop environment is implemented by virtualized resource instances in the cloud computing environment, it may appear to the end user as if it were a local desktop and it may operate as if it were an independent computer to which the user is connected. In some embodiments, the virtual desktop environment may provide access to productivity software and other software programs to which the user would typically have access if the user were logged onto a physical computer owned by the organization or enterprise. In at least some embodiments, an application fulfillment platform of the service provider may be configured to provide on-demand delivery of desktop applications (e.g., as virtualized application packages) to virtual desktop instances, as described herein.

In some embodiments, these virtual desktop instances may be intended to replace a desktop computer, e.g., they may be intended to run the same software programs that a member of the organization or enterprise on whose behalf they were instantiated and configured would access on a desktop computer in an office setting (e.g., applications that perform end-user productivity tasks). Note that these applications may or may not be stand-alone applications. For example, in some cases, each of the virtual desktop instances (and/or the applications running thereon) may be part of the active directory framework of the organization or enterprise and may be able to access shared files or other resources on the existing network of the organization or enterprise once the credential presented by the user upon logging into the virtual desktop instance have been authenticated.

In some embodiments, launching a virtual desktop instance may include making selected applications available to end users through a desktop application management module interface, according to the constraints and configuration parameter settings for the selected applications and users. In some cases, this may include installing any required applications and/or making certain applications (e.g., those applications that are assigned to a particular end user or those an end user is allowed to know about) visible and/or selectable through a desktop application management module interface or (once they are installed on an end user machine or in a virtual desktop instance) through an icon, shortcut, menu element, or other user interface mechanism or element thereof that was created on the desktop for the application and whose selection launches the application.

Illustrative System

Figure 13:
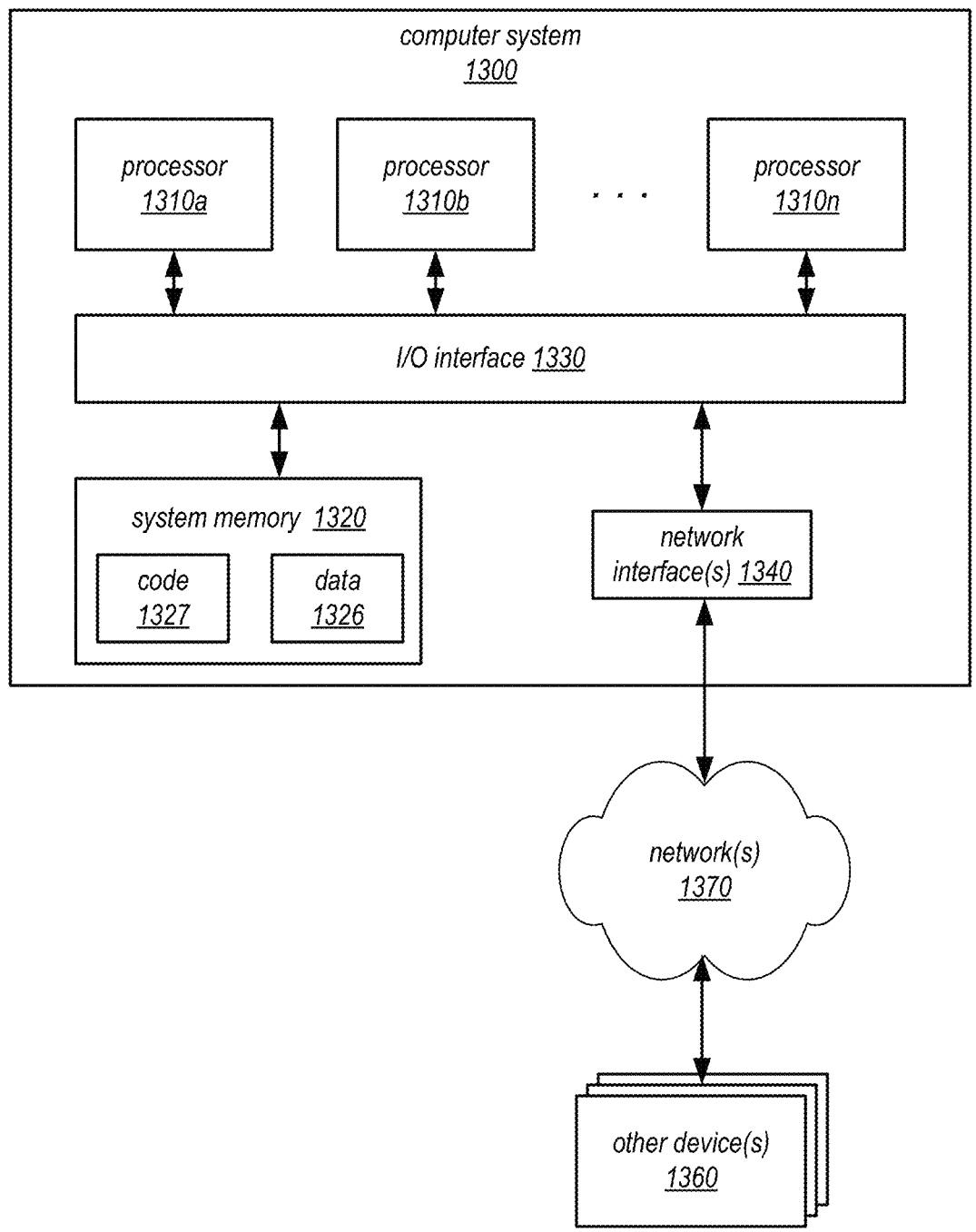
FIG. 13 is a block diagram illustrating an example computer system that implements some or all of the techniques described herein, according to different embodiments.

In at least some embodiments, a service that implements some or all of the techniques for providing on-demand delivery of desktop applications to desktops on physical computing devices and/or virtual desktops in a cloud computing environment and/or for identifying, presenting, and launching preferred desktop applications on virtual desktop instances based on captured interactivity data, as described herein, may include a computer system that includes or is configured to access a non-transitory computer-accessible (e.g., computer-readable) media, such as computer system 1300 illustrated in FIG. 13. For example, in various embodiments, any or all of the computer system components described herein (including, e.g., data center computers and/or other components on a service provider network that collectively provide virtual computing services and/or virtual storage services, virtualized computing resource instances, virtual machines, virtual machine monitors or hypervisors, and/or virtual desktop instances; or client computing devices or other components on a client network) may be implemented using a computer system similar to computer system 1300 that has been configured to provide the functionality of those components. In the illustrated embodiment, computer system 1300 includes one or more processors 1310 coupled to a system memory 1320 via an input/output (I/O) interface 1330. Computer system 1300 further includes one or more network interfaces 1340 coupled to I/O interface 1330. In some embodiments, network interfaces 1340 may include two or more network interfaces (including, e.g., one configured for communication between a virtualized computing resource hosted on the computer system 1300 and its clients, and one configured for communication between a virtualized computing resource and external resources, computing systems, data centers, or Internet destinations on networks other than the provider network and a client network on whose behalf the virtualized computing resources are hosted. In other embodiments, network interface(s) 1340 may be a single network interface.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be multi-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing on-demand delivery of desktop applications to desktops on physical computing devices or virtual desktops in a cloud computing environment and/or for identifying, presenting, and launching preferred desktop applications on virtual desktop instances based on captured interactivity data, are shown stored within system memory 1320 as code 1327 and data 1326. For example, data 1326 may include information representing the assignment of selected applications to particular end users and/or user groups, constraints and/or configuration parameter settings for the selected applications, users, and catalogs, and may be stored in any of a variety of data structures or database tables within memory 1320 on one or more computing nodes of a service provider system and/or client computing device used in providing on-demand delivery of desktop applications or identifying, presenting, and launching preferred desktop applications on virtual desktop instances based on captured interactivity data, as described herein. In some embodiments, data 1326 may also include application state data or scratch data, interactivity data, application/target preference data, or security tokens and/or unique identifiers of users and/or devices (physical computing devices, virtualized computing resource instances and/or virtual desktop instances), as described herein. In some embodiments, at least some of the data 1326 may be stored on a user volume within system memory 1320. In some embodiments, code 1327 may include application binaries or virtualized application packages (or portions thereof), a desktop application management module, an interactivity agent, and/or an application delivery agent, at least some of which may be stored on a boot volume within system memory 1320.

In one embodiment, I/O interface 1330 may be configured to coordinate I/O traffic between processor 1310, system memory 1320, and any peripheral devices in the device, including any of network interface(s) 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface(s) 1340 may be configured to allow data to be exchanged between computer system 1300 and other devices 1360 attached to a network or networks 1350, such as other computer systems or devices as illustrated in the figures, for example. In various embodiments, network interface(s) 1340 may support communication via any suitable wired or wireless general data networks, such as types of Ethernet network, for example. Additionally, network interface(s) 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for implementing various embodiments of the techniques described herein for providing on-demand delivery of desktop applications to desktops on physical computing devices and/or virtual desktops in a cloud computing environment and/or for identifying, presenting, and launching preferred desktop applications on virtual desktop instances based on captured interactivity data. However, in other embodiments, program instructions and/or data may be received, sent or stored upon different types of computer-accessible media. Generally speaking, a computer-accessible (e.g., computer-readable) medium may include non-transitory storage media or memory media such as magnetic or optical media, e.g., disk or DVD/CD coupled to computer system 1300 via I/O interface 1330. A non-transitory computer-accessible (e.g., computer-readable) storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface(s) 1340.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by one or more computers that collectively provide virtual computing services to one or more clients:
receiving, from a virtual desktop instance, data representing interactions between an end user and the virtual desktop instance that are associated with execution of a plurality of desktop applications installed on the virtual desktop instance, wherein the received data comprises end user input data provided to the installed desktop applications executing during a virtual desktop session, and wherein for individual ones of the desktop applications, the end user input data indicates the desktop application and indicates one or more documents or files associated with the desktop application that were accessed by the desktop application during the virtual desktop session;
determining, based at least in part on analysis of the end user input data provided to the plurality of desktop applications executing during the virtual desktop session and additional data, a collection of the desktop applications to be launched on the virtual desktop instance on behalf of the end user and particular documents or files to be opened in the collection of the desktop applications in response to invocation of a subsequent virtual desktop session,
wherein, based on the analysis of the end user input data and the additional data that indicates a length of time that the one or more documents or files were open in individual ones of the desktop applications during the virtual desktop session, the particular documents or files to be opened in the collection of the desktop applications to be launched in response to the invocation of the subsequent virtual desktop session comprises fewer documents or files than the documents or files that were accessed by the plurality of the desktop applications that were executed during the virtual desktop session; and
in response to invocation of the subsequent virtual desktop session, launching the collection of the plurality of the desktop applications and opening the particular documents or files on the virtual desktop instance.

2. The method of claim 1,
wherein said determining comprises determining a number of a plurality of desktop applications installed on the virtual desktop instance that are the desktop applications most recently executed on the virtual desktop instance, wherein the plurality of a desktop applications comprises the one or more desktop applications.

3. The method of claim 1,
wherein said determining comprises determining, for at least one of the one or more desktop applications installed on the virtual desktop instance, a cumulative amount of time during which the desktop application executed on the virtual desktop instance within a time period or within one or more virtual desktop sessions.

4. The method of claim 1,
wherein said determining comprises determining, for at least one of the one or more desktop applications installed on the virtual desktop instance, a cumulative amount of time during which the desktop application executed on the virtual desktop instance within a most recent sliding window of time.

5. The method of claim 1,
wherein said opening the particular documents or files comprises opening the particular documents or files within respective ones of the collection of desktop applications.

6. The method of claim 1,
wherein the method further comprises:
generating, prior to said launching, a display for presentation, wherein the display comprises a description of the collection of desktop applications and a user interface element what when selected causes the desktop applications in the collection of desktop applications to be launched; and
wherein said launching is performed in response to selection of the user interface element.

7. The method of claim 6, further comprising:
presenting the generated display on a mobile device that is distinct from a device on which the virtual desktop instance is executing.

8. The method of claim 6, wherein one or more of a format of the display or the content that is presented within the display is based at least in part on values of one or more system-wide, customer-specific, enterprise-wide, instance-specific, or user-specified configuration parameters.

9. The method of claim 1,
wherein the method further comprises generating, prior to said launching, a display for presentation, wherein the display comprises:
a description of the collection of desktop applications and the particular documents or files to be opened within respective ones of the desktop applications in the collection of desktop applications; and
one or more of:
a user interface element what when selected causes the desktop applications in the collection of desktop applications to be launched and the particular documents or files to be opened;
a user interface element for a pairing between a document or file and an associated desktop application whose selection results in launching the desktop application and opening the document or file; or
a user interface element for a pairing between a document or file and an associated desktop application whose selection results in preventing the launch of the desktop application and the opening of the document or file;
wherein said launching is performed in response to selection of one or more of the one or more user interface elements; and
wherein said launching the collection of desktop applications comprises opening the collection of documents or files.

10. The method of claim 1, wherein said launching is performed automatically in response an end user connecting to the virtual desktop instance, an end user logging into the virtual desktop instance, or a restart of the virtual desktop instance.

11. The method of claim 1, wherein one or more of an amount of data received, a type of data received, or a preferences policy used in said determining a collection of desktop applications is based at least in part on values of one or more system-wide, customer-specific, enterprise-wide, instance-specific, or user-specified configuration parameters.

12. A system, comprising:
a plurality of computing nodes that collectively provide virtual computing services to one or more clients of a service provider, each of the computing nodes comprising at least one processor and a memory; and
a virtualized computing resource instance executing on one of the computing nodes;
wherein the virtualized computing resource instance implements a virtual desktop instance on behalf of an end user that receives services from the service provider, and wherein an interactivity agent and virtualized desktop applications are installed on the virtual desktop instance;
wherein one or more of the plurality of computing nodes implement an application preferences service and a display generation component;
wherein, during a given virtual desktop session, the interactivity agent is configured to:
  collect interactivity data associated with execution of a plurality of the virtualized desktop applications, wherein the interactivity data comprises end user input data provided to the plurality of virtualized desktop applications executing during the virtual desktop session, and wherein for individual ones of the virtualized desktop applications, the end user input data indicates the virtualized desktop application and indicates one or more documents or files associated with the virtualized desktop application that were accessed by the virtualized desktop application during the virtual desktop session; and
  make the interactivity data and additional data available to the application preferences service, wherein the additional data indicates, for the individual ones of the virtualized desktop applications, a length of time that the one or more documents or files were open in the virtualized desktop application; and
wherein the application preferences service is configured to:
  determine, based at least in part on analysis of the end user input data provided to the plurality of virtualized desktop applications executing during the virtual desktop session and the additional data, a collection of the virtualized desktop applications to be launched on behalf of the end user and particular documents or files to be opened in the collection of the virtualized desktop applications in response to a single selection by the end user during one or more subsequent virtual desktop sessions,
  wherein, based on the analysis of the end user input data and the additional data that indicates the length of time that the one or more documents or files were open in the individual ones of the virtualized desktop applications during the virtual desktop session, the particular documents or files to be opened in the collection of the virtualized desktop applications to be launched in response to the single selection comprises fewer documents or files than the documents or files that were accessed by the plurality of the virtualized desktop applications that were executed during the virtual desktop session; and
  provide, in response to invocation of a subsequent virtual desktop session, data indicating the collection of virtualized desktop applications and the particular documents or files to the display generation component; and wherein the display generation component is configured to:
  generate, in response to invocation of the subsequent virtual desktop session, a display for presentation on the virtual desktop instance, wherein the display comprises information indicating the collection of virtualized desktop applications and a user interface mechanism that, when selected via the single selection, causes the collection of virtualized desktop applications to be launched and the particular documents or files to be opened on the virtual desktop instance.

13. The system of claim 12,
wherein the application preferences service is further configured to store the interactivity data to storage resources of the service provider, wherein the interactivity data is stored in association with data representing one or more of: a unique identifier of the virtual desktop instance, a unique identifier of the end user, a unique identifier of a virtualized desktop application, a unique identifier of a document or file accessed within a virtualized desktop application, or a time-to-live indicator.

14. The system of claim 12,
wherein the display further comprises information indicating the particular documents or files; and
wherein, when selected, the user interface mechanism causes all of the documents or files in the particular documents or files to be opened within respective ones of the virtualized desktop applications in the collection of virtualized desktop applications.

15. The system of claim 12,
wherein, to determine the collection of virtualized desktop applications that are to be launched on behalf of the end user during one or more subsequent virtual desktop sessions, the application preferences service is configured to determine, based at least in part on the interactivity data, a group of the virtualized desktop applications that were most recently executed on the virtual desktop instance with respect to the plurality of virtualized desktop applications or a group of the virtualized desktop applications that experienced the most cumulative usage on the desktop instance over an amount of time with respect to the plurality of virtualized desktop applications.

16. The system of claim 12,
wherein the system further comprises a recommendation engine; and
wherein the recommendation engine is configured to:
  determine, based at least in part on the interactivity data, one or more other virtualized desktop applications to be recommended for use by the end user; and
  provide data indicating the one or more recommended virtualized desktop applications to the display generation component for subsequent presentation on the virtual desktop instance.

17. A non-transitory computer-readable storage medium storing program instructions that when executed on one or more computers cause the one or more computers to implement a service platform, wherein the service platform is configured to perform:
  provisioning, on virtualized computing resources and on behalf of a service customer, a virtual desktop instance;
  receiving data representing interactions between an end user and the virtual desktop instance that are associated with execution of a plurality of desktop applications installed on the virtual desktop instance, wherein the received data comprises end user input data provided to the installed desktop applications executing during a virtual desktop session, and wherein for individual ones of the desktop applications, the end user input data indicates the desktop application and indicates one or more documents or files associated with the desktop application that were accessed by the desktop application during the virtual desktop session;

determining, based at least in part on analysis of the end user input data provided to the plurality of desktop applications executing during the virtual desktop session and additional data, a collection of the desktop applications to be launched on the virtual desktop instance and particular documents or files to be opened in the collection of the desktop applications in response to invocation of a subsequent virtual desktop session, wherein, based on the analysis of the end user input data and the additional data that indicates a length of time that the one or more documents or files were open in the individual ones of the desktop applications during the virtual desktop session, the particular documents or files to be opened in the collection of the desktop applications to be launched in response to the invocation of the subsequent virtual desktop session comprises fewer documents or files than the documents or files that were accessed by the plurality of the desktop applications that were executed during the virtual desktop session; and in response to invocation of the subsequent virtual desktop session, launching the collection of the plurality of the desktop applications and opening the particular documents or files on the virtual desktop instance.

18. The non-transitory computer-readable storage medium of claim 17,
   wherein said opening the particular documents or files comprises opening the particular documents or files respective ones of the collection of desktop applications.

19. The non-transitory computer-readable storage medium of claim 17,
   wherein said determining comprises determining, based at least in part on the data received, how recently one of the desktop applications installed on the virtual desktop instance was executed on the virtual desktop instance or a cumulative amount of time that one of the desktop applications was executed on the virtual desktop instance during one or more virtual desktop sessions.

20. The non-transitory computer-readable storage medium of claim 17,
   wherein the subsequent virtual desktop session is invoked following a failure of the virtualized computing resources or a re-provisioning of the virtual desktop instance; and
   wherein the service platform is further configured to perform:
      storing application state data or scratch data generated by one of the desktop applications in the collection of desktop applications;
      reinstalling the one of the desktop applications;
      retrieving the application state data or scratch data; and
      attaching the application state data or scratch data to the one of the desktop applications subsequent to is reinstallation.

* * * * *